United States Patent
Chen

(10) Patent No.: US 7,427,693 B1
(45) Date of Patent: Sep. 23, 2008

(54) POLAR LIQUID CRYSTAL

(75) Inventor: Xinhua Chen, Erie, CO (US)

(73) Assignee: Daily Polymer Corporation, Kaohsiung Hsien (TW)

( * ) Notice: Subject to any disclaimer, the term of this patent is extended or adjusted under 35 U.S.C. 154(b) by 0 days.

(21) Appl. No.: 11/695,989

(22) Filed: Apr. 3, 2007

(51) Int. Cl.
*C07C 49/00* (2006.01)
*C07C 45/00* (2006.01)
*C07D 309/00* (2006.01)
*C07D 311/00* (2006.01)
*C07D 221/18* (2006.01)
*C07D 239/00* (2006.01)
*G02F 1/13* (2006.01)

(52) U.S. Cl. .................. 568/330; 568/349; 549/357; 549/407; 546/26; 546/255; 544/242; 544/245; 544/335; 349/1

(58) Field of Classification Search .................. None
See application file for complete search history.

(56) References Cited

U.S. PATENT DOCUMENTS 3,644,502 A * 2/1972 Morin et al. ................. 562/503
3,769,316 A * 10/1973 Hauser et al. ................ 560/126

* cited by examiner

*Primary Examiner*—Sikarl A Witherspoon
(74) *Attorney, Agent, or Firm*—Greenlee, Winner and Sullivan, P.C.

(57) ABSTRACT

Compounds that are useful in compositions for flat panel displays, for example, are provided. The compounds provided are polar, and are useful in low threshold voltage mixtures. The compounds provided have the general structure: $CpCOCH_2[A]_nZ_1[B]_mZ_2PhX_1X_2Y$, where $CpCOCH2$ is the structure:

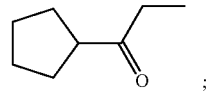

A and B are independently in each instance selected from the group consisting of 1,4-cyclohexane, 1,4-phenyl, 1,3-dioxan-5,2-diyl; pyridine-5,2-diyl; and pyrimidin-5,2-diyl; n and m are independently in each instance 0, 1 or 2; $Z_1$ and $Z_2$ are independently a single bond, $-(CH_2)_2-$, $CF_2O$, $OCF_2$, $CH_2O$, $OCH_2$, $-C\equiv C-$, COO, OOC; and Y is selected from the group consisting of: F, Cl, CN, $OCH_2F$, $CHF_2$, $OCF_3$, and $CF_3$.

20 Claims, No Drawings

POLAR LIQUID CRYSTAL

BACKGROUND OF THE INVENTION

Liquid crystal displays use mixtures of liquid crystals having desired material properties such as operating temperature range, thermal stability, light stability, switching time, and contrast ratio. The material properties of the mixtures are determined by the constituents of the mixtures.

The demand for liquid crystal displays having improved performance has increased. In particular, liquid crystal mixtures having low threshold voltage are desired, especially for display applications. The threshold voltage is the amount of voltage across a pixel to produce a response. Addressing pixels with lower voltages allows simplification of the electronics used, resulting in the possibility for space and weight savings. The threshold voltage is inversely proportional to the dielectric anisotropy of the mixture. Therefore, one way to improve the properties of a liquid crystal mixture having low threshold voltage should be the use of polar liquid crystal components in the mixtures, to increase the dielectric anisotropy of the mixture.

Improved polar liquid crystal components are needed.

SUMMARY OF THE INVENTION

Provided are compounds of formula:

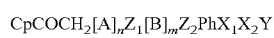

(also shown as

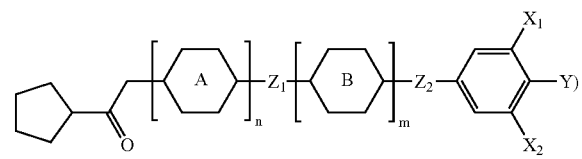

where

A and B are independently in each instance selected from the group consisting of Ch, Ph, Dx, Py and Pm;

Ph can be substituted by 1 or 2 halogens, in addition to the $X_1$, $X_2$ and Y substituents;

n and m are independently in each instance 0, 1 or 2;

$Z_1$ and $Z_2$ are independently a single bond, —$(CH_2)_2$—, $CF_2O$, $OCF_2$, $CH_2O$, $OCH_2$, —C≡C—, COO, OOC;

$X_1$ and $X_2$ are each independently H or F;

Y is selected from the group consisting of: F, Cl, CN, $OCH_2F$, $CHF_2$, $OCF_3$, and $CF_3$.

The A and B rings can be optionally independently substituted with one or more halogens, particularly chlorine.

Halogen means independently selected from the group consisting of: fluorine, chlorine, bromine or iodine. In any group which contains one or more fluorine atoms, any fluorine can be independently substituted by chlorine.

Provided below are additional definitions.

$CpCOCH_2$ is used to indicate the structure:

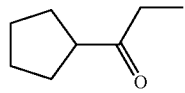

where Cp indicates cyclopentane.

Ch is used to indicate 1,4-cyclohexane. The Ch structure is shown below:

Ph is used to indicate 1,4-phenyl. The Ph structure is shown below:

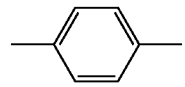

Dx is used to indicate 1,3-dioxan-5,2-diyl. Options for the Dx structure are shown below:

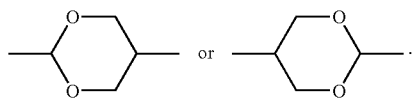

Py is used to indicate pyrin-5,2-diyl. Options for the Py structure are shown below:

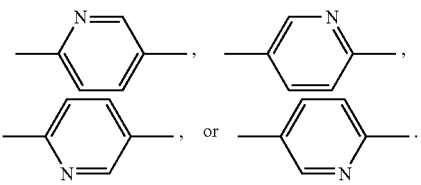

Pm is used to indicate pyrimidin-5,2-diyl. Options for the Pm structure are shown below:

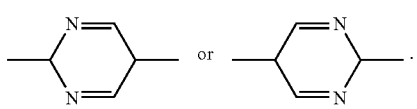

$PhX_1X_2Y$ is used to indicate any of the below structures:

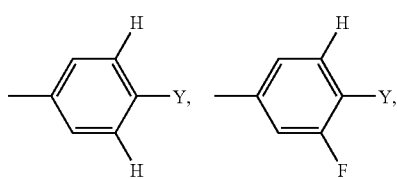

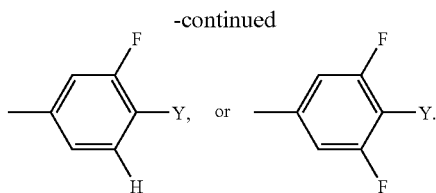

The compounds of the invention may be used as components in any desired liquid crystal mixture, such as those mixtures known in the art. As known in the art, there are typically many components of such mixtures, as determined by the desired use of the mixture. These components can be determined by one having ordinary skill in the art without undue experimentation. The addition of one or more compounds of the invention in liquid crystal mixtures improves the properties of the mixture, including lowering threshold voltage, increasing switching speed and other properties which are known in the art. The compounds of the invention may be used in any useful amount in a liquid crystal mixture, including less than 0.1% by weight of the total composition; less than 0.5% by weight of the total composition; less than 1% by weight of the total composition, less than 3% by weight of the total composition; less than 5% by weight of the total composition; less than 7% by weight of the total composition; less than 10% by weight of the total composition; less than 20% by weight of the total composition; less than 25% by weight of the total composition; less than 30% by weight of the total composition; less than 35% by weight of the total composition; less than 40% by weight of the total composition; less than 50% by weight of the total composition; and any other useful amount.

It is desired that the compounds have a high dielectric constant. As used herein, "high dielectric constant" means above 10. Some compounds of the invention have dielectric constants between 1 and 20.

The compounds of the invention are useful in mixtures for liquid crystal applications, including low threshold voltage liquid crystal displays.

DETAILED DESCRIPTION OF THE INVENTION

The following non-limiting description provides examples of some embodiments of the invention. The synthesis of compounds of the invention not specifically exemplified here can be carried out by one of ordinary skill in the art without undue experimentation.

The use of one or more compounds of the invention in mixtures having desired properties for various liquid crystal applications is known to one of ordinary skill in the art without undue experimentation.

Devices comprising one or more compounds of the invention can be made and operated by one of ordinary skill in the art without undue experimentation.

Some of the substituents for the compounds of the invention are provided in the following table. It is understood the group CpCOCH$_2$— is provided at the terminus of the compounds in the Table. All compounds in the Table are intended to be included to the same extent as if they were individually drawn and are intended to be able to be included or excluded in any grouping or any claim. In the Table, A(1) indicates the first A ring, A(2) indicates the second A ring, and so on. A dash means the group is not present. In the compounds listed herein, any substituent can be reversed, and all such compounds are included herein to the same extent as if they were independently written. For example, the group —OCF$_2$— can also be written —CF$_2$O— and both groups are included in the compounds described herein. Also, the group —CH$_2$O— can be written as —OCH$_2$— and both groups are included in the compounds described herein. Also, the group —COO— can be written as —OOC— and both groups are included in the compounds described herein.

Table of exemplary substituents:

| n | A(1) | A(2) | A(3) | Z$_1$ | m | B(1) | B(2) | B(3) | Z$_2$ | X$_1$ | X$_2$ | Y |
|---|---|---|---|---|---|---|---|---|---|---|---|---|
| 1 | Ch | — | — | single bond | 0 | — | — | — | single bond | H | H | F |
| 1 | Ch | — | — | single bond | 0 | — | — | — | single bond | F | H | F |
| 1 | Ch | — | — | single bond | 0 | — | — | — | single bond | H | F | F |
| 1 | Ch | — | — | —(CH$_2$)$_2$— | 0 | — | — | — | single bond | H | H | F |
| 1 | Ch | — | — | —(CH$_2$)$_2$— | 0 | — | — | — | single bond | F | H | F |
| 1 | Ch | — | — | —(CH$_2$)$_2$— | 0 | — | — | — | single bond | H | F | F |
| 1 | Ch | — | — | —CF$_2$O— | 0 | — | — | — | single bond | H | H | F |
| 1 | Ch | — | — | —CF$_2$O— | 0 | — | — | — | single bond | F | H | F |
| 1 | Ch | — | — | —CF$_2$O— | 0 | — | — | — | single bond | H | F | F |
| 1 | Ch | — | — | —OCF$_2$— | 0 | — | — | — | single bond | H | H | F |
| 1 | Ch | — | — | —OCF$_2$— | 0 | — | — | — | single bond | F | H | F |
| 1 | Ch | — | — | —OCF$_2$— | 0 | — | — | — | single bond | H | F | F |
| 1 | Ch | — | — | —CH$_2$O— | 0 | — | — | — | single bond | H | H | F |

-continued

Table of exemplary substituents:

| n | A(1) | A(2) | A(3) | Z₁ | m | B(1) | B(2) | B(3) | Z₂ | X₁ | X₂ | Y |
|---|---|---|---|---|---|---|---|---|---|---|---|---|
| 1 | Ch | — | — | —CH₂O— | 0 | — | — | — | single bond | F | H | F |
| 1 | Ch | — | — | —CH₂O— | 0 | — | — | — | single bond | H | F | F |
| 1 | Ch | — | — | —OCH₂— | 0 | — | — | — | single bond | H | H | F |
| 1 | Ch | — | — | —OCH₂— | 0 | — | — | — | single bond | F | H | F |
| 1 | Ch | — | — | —OCH₂— | 0 | — | — | — | single bond | H | F | F |
| 1 | Ch | — | — | —C≡C— | 0 | — | — | — | single bond | H | H | F |
| 1 | Ch | — | — | —C≡C— | 0 | — | — | — | single bond | F | H | F |
| 1 | Ch | — | — | —C≡C— | 0 | — | — | — | single bond | H | F | F |
| 1 | Ch | — | — | —COO— | 0 | — | — | — | single bond | H | H | F |
| 1 | Ch | — | — | —COO— | 0 | — | — | — | single bond | F | H | F |
| 1 | Ch | — | — | —COO— | 0 | — | — | — | single bond | H | F | F |
| 1 | Ch | — | — | —OOC— | 0 | — | — | — | single bond | H | H | F |
| 1 | Ch | — | — | —OOC— | 0 | — | — | — | single bond | F | H | F |
| 1 | Ch | — | — | —OOC— | 0 | — | — | — | single bond | H | F | F |
| 1 | Ch | — | — | single bond | 0 | — | — | — | —(CH₂)₂— | H | H | F |
| 1 | Ch | — | — | single bond | 0 | — | — | — | —(CH₂)₂— | F | H | F |
| 1 | Ch | — | — | single bond | 0 | — | — | — | —(CH₂)₂— | H | F | F |
| 1 | Ch | — | — | single bond | 0 | — | — | — | —CF₂O— | H | H | F |
| 1 | Ch | — | — | single bond | 0 | — | — | — | —CF₂O— | F | H | F |
| 1 | Ch | — | — | single bond | 0 | — | — | — | —CF₂O— | H | F | F |
| 1 | Ch | — | — | single bond | 0 | — | — | — | —OCF₂— | H | H | F |
| 1 | Ch | — | — | single bond | 0 | — | — | — | —OCF₂— | F | H | F |
| 1 | Ch | — | — | single bond | 0 | — | — | — | —OCF₂— | H | F | F |
| 1 | Ch | — | — | single bond | 0 | — | — | — | —CH₂O— | H | H | F |
| 1 | Ch | — | — | single bond | 0 | — | — | — | —CH₂O— | F | H | F |
| 1 | Ch | — | — | single bond | 0 | — | — | — | —CH₂O— | H | F | F |
| 1 | Ch | — | — | single bond | 0 | — | — | — | —OCH₂— | H | H | F |
| 1 | Ch | — | — | single bond | 0 | — | — | — | —OCH₂— | F | H | F |
| 1 | Ch | — | — | single bond | 0 | — | — | — | —OCH₂— | H | F | F |
| 1 | Ch | — | — | single bond | 0 | — | — | — | —C≡C— | H | H | F |
| 1 | Ch | — | — | single bond | 0 | — | — | — | —C≡C— | F | H | F |
| 1 | Ch | — | — | single bond | 0 | — | — | — | —C≡C— | H | F | F |
| 1 | Ch | — | — | single bond | 0 | — | — | — | —COO— | H | H | F |
| 1 | Ch | — | — | single bond | 0 | — | — | — | —COO— | F | H | F |
| 1 | Ch | — | — | single bond | 0 | — | — | — | —COO— | H | F | F |
| 1 | Ch | — | — | single bond | 0 | — | — | — | —OOC— | H | H | F |
| 1 | Ch | — | — | single bond | 0 | — | — | — | —OOC— | F | H | F |
| 1 | Ch | — | — | single | 0 | — | — | — | —OOC— | H | F | F |

-continued

Table of exemplary substituents:

| n | A(1) | A(2) | A(3) | $Z_1$ | m | B(1) | B(2) | B(3) | $Z_2$ | $X_1$ | $X_2$ | Y |
|---|---|---|---|---|---|---|---|---|---|---|---|---|
| 1 | Ph | — | — | single bond | 0 | — | — | — | single bond | H | H | F |
| 1 | Ph | — | — | single bond | 0 | — | — | — | single bond | F | H | F |
| 1 | Ph | — | — | single bond | 0 | — | — | — | single bond | H | F | F |
| 1 | Ph | — | — | —(CH$_2$)$_2$— | 0 | — | — | — | single bond | H | H | F |
| 1 | Ph | — | — | —(CH$_2$)$_2$— | 0 | — | — | — | single bond | F | H | F |
| 1 | Ph | — | — | —(CH$_2$)$_2$— | 0 | — | — | — | single bond | H | F | F |
| 1 | Ph | — | — | —CF$_2$O— | 0 | — | — | — | single bond | H | H | F |
| 1 | Ph | — | — | —CF$_2$O— | 0 | — | — | — | single bond | F | H | F |
| 1 | Ph | — | — | —CF$_2$O— | 0 | — | — | — | single bond | H | F | F |
| 1 | Ph | — | — | —OCF$_2$— | 0 | — | — | — | single bond | H | H | F |
| 1 | Ph | — | — | —OCF$_2$— | 0 | — | — | — | single bond | F | H | F |
| 1 | Ph | — | — | —OCF$_2$— | 0 | — | — | — | single bond | H | F | F |
| 1 | Ph | — | — | —CH$_2$O— | 0 | — | — | — | single bond | H | H | F |
| 1 | Ph | — | — | —CH$_2$O— | 0 | — | — | — | single bond | F | H | F |
| 1 | Ph | — | — | —CH$_2$O— | 0 | — | — | — | single bond | H | F | F |
| 1 | Ph | — | — | —OCH$_2$— | 0 | — | — | — | single bond | H | H | F |
| 1 | Ph | — | — | —OCH$_2$— | 0 | — | — | — | single bond | F | H | F |
| 1 | Ph | — | — | —OCH$_2$— | 0 | — | — | — | single bond | H | F | F |
| 1 | Ph | — | — | —C≡C— | 0 | — | — | — | single bond | H | H | F |
| 1 | Ph | — | — | —C≡C— | 0 | — | — | — | single bond | F | H | F |
| 1 | Ph | — | — | —C≡C— | 0 | — | — | — | single bond | H | F | F |
| 1 | Ph | — | — | —COO— | 0 | — | — | — | single bond | H | H | F |
| 1 | Ph | — | — | —COO— | 0 | — | — | — | single bond | F | H | F |
| 1 | Ph | — | — | —COO— | 0 | — | — | — | single bond | H | F | F |
| 1 | Ph | — | — | —OOC— | 0 | — | — | — | single bond | H | H | F |
| 1 | Ph | — | — | —OOC— | 0 | — | — | — | single bond | F | H | F |
| 1 | Ph | — | — | —OOC— | 0 | — | — | — | single bond | H | F | F |
| 1 | Ph | — | — | single bond | 0 | — | — | — | —(CH$_2$)$_2$— | H | H | F |
| 1 | Ph | — | — | single bond | 0 | — | — | — | —(CH$_2$)$_2$— | F | H | F |
| 1 | Ph | — | — | single bond | 0 | — | — | — | —(CH$_2$)$_2$— | H | F | F |
| 1 | Ph | — | — | single bond | 0 | — | — | — | —CF$_2$O— | H | H | F |
| 1 | Ph | — | — | single bond | 0 | — | — | — | —CF$_2$O— | F | H | F |
| 1 | Ph | — | — | single bond | 0 | — | — | — | —CF$_2$O— | H | F | F |
| 1 | Ph | — | — | single bond | 0 | — | — | — | —OCF$_2$— | H | H | F |
| 1 | Ph | — | — | single bond | 0 | — | — | — | —OCF$_2$— | F | H | F |
| 1 | Ph | — | — | single bond | 0 | — | — | — | —OCF$_2$— | H | F | F |
| 1 | Ph | — | — | single bond | 0 | — | — | — | —CH$_2$O— | H | H | F |

-continued

Table of exemplary substituents:

| n | A(1) | A(2) | A(3) | $Z_1$ | m | B(1) | B(2) | B(3) | $Z_2$ | $X_1$ | $X_2$ | Y |
|---|---|---|---|---|---|---|---|---|---|---|---|---|
| 1 | Ph | — | — | single bond | 0 | — | — | — | —CH$_2$O— | F | H | F |
| 1 | Ph | — | — | single bond | 0 | — | — | — | —CH$_2$O— | H | F | F |
| 1 | Ph | — | — | single bond | 0 | — | — | — | —OCH$_2$— | H | H | F |
| 1 | Ph | — | — | single bond | 0 | — | — | — | —OCH$_2$— | F | H | F |
| 1 | Ph | — | — | single bond | 0 | — | — | — | —OCH$_2$— | H | F | F |
| 1 | Ph | — | — | single bond | 0 | — | — | — | —C≡C— | H | H | F |
| 1 | Ph | — | — | single bond | 0 | — | — | — | —C≡C— | F | H | F |
| 1 | Ph | — | — | single bond | 0 | — | — | — | —C≡C— | H | F | F |
| 1 | Ph | — | — | single bond | 0 | — | — | — | —COO— | H | H | F |
| 1 | Ph | — | — | single bond | 0 | — | — | — | —COO— | F | H | F |
| 1 | Ph | — | — | single bond | 0 | — | — | — | —COO— | H | F | F |
| 1 | Ph | — | — | single bond | 0 | — | — | — | —OOC— | H | H | F |
| 1 | Ph | — | — | single bond | 0 | — | — | — | —OOC— | F | H | F |
| 1 | Ph | — | — | single bond | 0 | — | — | — | —OOC— | H | F | F |
| 1 | Dx | — | — | single bond | 0 | — | — | — | single bond | H | H | F |
| 1 | Dx | — | — | single bond | 0 | — | — | — | single bond | F | H | F |
| 1 | Dx | — | — | single bond | 0 | — | — | — | single bond | H | F | F |
| 1 | Dx | — | — | —(CH$_2$)$_2$— | 0 | — | — | — | single bond | H | H | F |
| 1 | Dx | — | — | —(CH$_2$)$_2$— | 0 | — | — | — | single bond | F | H | F |
| 1 | Dx | — | — | —(CH$_2$)$_2$— | 0 | — | — | — | single bond | H | F | F |
| 1 | Dx | — | — | —CF$_2$O— | 0 | — | — | — | single bond | H | H | F |
| 1 | Dx | — | — | —CF$_2$O— | 0 | — | — | — | single bond | F | H | F |
| 1 | Dx | — | — | —CF$_2$O— | 0 | — | — | — | single bond | H | F | F |
| 1 | Dx | — | — | —OCF$_2$— | 0 | — | — | — | single bond | H | H | F |
| 1 | Dx | — | — | —OCF$_2$— | 0 | — | — | — | single bond | F | H | F |
| 1 | Dx | — | — | —OCF$_2$— | 0 | — | — | — | single bond | H | F | F |
| 1 | Dx | — | — | —CH$_2$O— | 0 | — | — | — | single bond | H | H | F |
| 1 | Dx | — | — | —CH$_2$O— | 0 | — | — | — | single bond | F | H | F |
| 1 | Dx | — | — | —CH$_2$O— | 0 | — | — | — | single bond | H | F | F |
| 1 | Dx | — | — | —OCH$_2$— | 0 | — | — | — | single bond | H | H | F |
| 1 | Dx | — | — | —OCH$_2$— | 0 | — | — | — | single bond | F | H | F |
| 1 | Dx | — | — | —OCH$_2$— | 0 | — | — | — | single bond | H | F | F |
| 1 | Dx | — | — | —C≡C— | 0 | — | — | — | single bond | H | H | F |
| 1 | Dx | — | — | —C≡C— | 0 | — | — | — | single bond | F | H | F |
| 1 | Dx | — | — | —C≡C— | 0 | — | — | — | single bond | H | F | F |
| 1 | Dx | — | — | —COO— | 0 | — | — | — | single bond | H | H | F |
| 1 | Dx | — | — | —COO— | 0 | — | — | — | single bond | F | H | F |
| 1 | Dx | — | — | —COO— | 0 | — | — | — | single bond | H | F | F |

-continued

Table of exemplary substituents:

| n | A(1) | A(2) | A(3) | Z₁ | m | B(1) | B(2) | B(3) | Z₂ | X₁ | X₂ | Y |
|---|---|---|---|---|---|---|---|---|---|---|---|---|
| 1 | Dx | — | — | —OOC— | 0 | — | — | — | single bond | H | H | F |
| 1 | Dx | — | — | —OOC— | 0 | — | — | — | single bond | F | H | F |
| 1 | Dx | — | — | —OOC— | 0 | — | — | — | single bond | H | F | F |
| 1 | Dx | — | — | single bond | 0 | — | — | — | —(CH₂)₂— | H | H | F |
| 1 | Dx | — | — | single bond | 0 | — | — | — | —(CH₂)₂— | F | H | F |
| 1 | Dx | — | — | single bond | 0 | — | — | — | —(CH₂)₂— | H | F | F |
| 1 | Dx | — | — | single bond | 0 | — | — | — | —CF₂O— | H | H | F |
| 1 | Dx | — | — | single bond | 0 | — | — | — | —CF₂O— | F | H | F |
| 1 | Dx | — | — | single bond | 0 | — | — | — | —CF₂O— | H | F | F |
| 1 | Dx | — | — | single bond | 0 | — | — | — | —OCF₂— | H | H | F |
| 1 | Dx | — | — | single bond | 0 | — | — | — | —OCF₂— | F | H | F |
| 1 | Dx | — | — | single bond | 0 | — | — | — | —OCF₂— | H | F | F |
| 1 | Dx | — | — | single bond | 0 | — | — | — | —CH₂O— | H | H | F |
| 1 | Dx | — | — | single bond | 0 | — | — | — | —CH₂O— | F | H | F |
| 1 | Dx | — | — | single bond | 0 | — | — | — | —CH₂O— | H | F | F |
| 1 | Dx | — | — | single bond | 0 | — | — | — | —OCH₂— | H | H | F |
| 1 | Dx | — | — | single bond | 0 | — | — | — | —OCH₂— | F | H | F |
| 1 | Dx | — | — | single bond | 0 | — | — | — | —OCH₂— | H | F | F |
| 1 | Dx | — | — | single bond | 0 | — | — | — | —C≡C— | H | H | F |
| 1 | Dx | — | — | single bond | 0 | — | — | — | —C≡C— | F | H | F |
| 1 | Dx | — | — | single bond | 0 | — | — | — | —C≡C— | H | F | F |
| 1 | Dx | — | — | single bond | 0 | — | — | — | —COO— | H | H | F |
| 1 | Dx | — | — | single bond | 0 | — | — | — | —COO— | F | H | F |
| 1 | Dx | — | — | single bond | 0 | — | — | — | —COO— | H | F | F |
| 1 | Dx | — | — | single bond | 0 | — | — | — | —OOC— | H | H | F |
| 1 | Dx | — | — | single bond | 0 | — | — | — | —OOC— | F | H | F |
| 1 | Dx | — | — | single bond | 0 | — | — | — | —OOC— | H | F | F |
| 1 | Py | — | — | single bond | 0 | — | — | — | single bond | H | H | F |
| 1 | Py | — | — | single bond | 0 | — | — | — | single bond | F | H | F |
| 1 | Py | — | — | single bond | 0 | — | — | — | single bond | H | F | F |
| 1 | Py | — | — | —(CH₂)₂— | 0 | — | — | — | single bond | H | H | F |
| 1 | Py | — | — | —(CH₂)₂— | 0 | — | — | — | single bond | F | H | F |
| 1 | Py | — | — | —(CH₂)₂— | 0 | — | — | — | single bond | H | F | F |
| 1 | Py | — | — | —CF₂O— | 0 | — | — | — | single bond | H | H | F |
| 1 | Py | — | — | —CF₂O— | 0 | — | — | — | single bond | F | H | F |
| 1 | Py | — | — | —CF₂O— | 0 | — | — | — | single bond | H | F | F |
| 1 | Py | — | — | —OCF₂— | 0 | — | — | — | single bond | H | H | F |

-continued

Table of exemplary substituents:

| n | A(1) | A(2) | A(3) | Z₁ | m | B(1) | B(2) | B(3) | Z₂ | X₁ | X₂ | Y |
|---|---|---|---|---|---|---|---|---|---|---|---|---|
| 1 | Py | — | — | —OCF₂— | 0 | — | — | — | single bond | F | H | F |
| 1 | Py | — | — | —OCF₂— | 0 | — | — | — | single bond | H | F | F |
| 1 | Py | — | — | —CH₂O— | 0 | — | — | — | single bond | H | H | F |
| 1 | Py | — | — | —CH₂O— | 0 | — | — | — | single bond | F | H | F |
| 1 | Py | — | — | —CH₂O— | 0 | — | — | — | single bond | H | F | F |
| 1 | Py | — | — | —OCH₂— | 0 | — | — | — | single bond | H | H | F |
| 1 | Py | — | — | —OCH₂— | 0 | — | — | — | single bond | F | H | F |
| 1 | Py | — | — | —OCH₂— | 0 | — | — | — | single bond | H | F | F |
| 1 | Py | — | — | —C≡C— | 0 | — | — | — | single bond | H | H | F |
| 1 | Py | — | — | —C≡C— | 0 | — | — | — | single bond | F | H | F |
| 1 | Py | — | — | —C≡C— | 0 | — | — | — | single bond | H | F | F |
| 1 | Py | — | — | —COO— | 0 | — | — | — | single bond | H | H | F |
| 1 | Py | — | — | —COO— | 0 | — | — | — | single bond | F | H | F |
| 1 | Py | — | — | —COO— | 0 | — | — | — | single bond | H | F | F |
| 1 | Py | — | — | —OOC— | 0 | — | — | — | single bond | H | H | F |
| 1 | Py | — | — | —OOC— | 0 | — | — | — | single bond | F | H | F |
| 1 | Py | — | — | —OOC— | 0 | — | — | — | single bond | H | F | F |
| 1 | Py | — | — | single bond | 0 | — | — | — | —(CH₂)₂— | H | H | F |
| 1 | Py | — | — | single bond | 0 | — | — | — | —(CH₂)₂— | F | H | F |
| 1 | Py | — | — | single bond | 0 | — | — | — | —(CH₂)₂— | H | F | F |
| 1 | Py | — | — | single bond | 0 | — | — | — | —CF₂O— | H | H | F |
| 1 | Py | — | — | single bond | 0 | — | — | — | —CF₂O— | F | H | F |
| 1 | Py | — | — | single bond | 0 | — | — | — | —CF₂O— | H | F | F |
| 1 | Py | — | — | single bond | 0 | — | — | — | —OCF₂— | H | H | F |
| 1 | Py | — | — | single bond | 0 | — | — | — | —OCF₂— | F | H | F |
| 1 | Py | — | — | single bond | 0 | — | — | — | —OCF₂— | H | F | F |
| 1 | Py | — | — | single bond | 0 | — | — | — | —CH₂O— | H | H | F |
| 1 | Py | — | — | single bond | 0 | — | — | — | —CH₂O— | F | H | F |
| 1 | Py | — | — | single bond | 0 | — | — | — | —CH₂O— | H | F | F |
| 1 | Py | — | — | single bond | 0 | — | — | — | —OCH₂— | H | H | F |
| 1 | Py | — | — | single bond | 0 | — | — | — | —OCH₂— | F | H | F |
| 1 | Py | — | — | single bond | 0 | — | — | — | —OCH₂— | H | F | F |
| 1 | Py | — | — | single bond | 0 | — | — | — | —C≡C— | H | H | F |
| 1 | Py | — | — | single bond | 0 | — | — | — | —C≡C— | F | H | F |
| 1 | Py | — | — | single bond | 0 | — | — | — | —C≡C— | H | F | F |
| 1 | Py | — | — | single bond | 0 | — | — | — | —COO— | H | H | F |
| 1 | Py | — | — | single bond | 0 | — | — | — | —COO— | F | H | F |
| 1 | Py | — | — | single bond | 0 | — | — | — | —COO— | H | F | F |

-continued

Table of exemplary substituents:

| n | A(1) | A(2) | A(3) | $Z_1$ | m | B(1) | B(2) | B(3) | $Z_2$ | $X_1$ | $X_2$ | Y |
|---|---|---|---|---|---|---|---|---|---|---|---|---|
| 1 | Py | — | — | single bond | 0 | — | — | — | —OOC— | H | H | F |
| 1 | Py | — | — | single bond | 0 | — | — | — | —OOC— | F | H | F |
| 1 | Py | — | — | single bond | 0 | — | — | — | —OOC— | H | F | F |
| 1 | Pm | — | — | single bond | 0 | — | — | — | single bond | H | H | F |
| 1 | Pm | — | — | single bond | 0 | — | — | — | single bond | F | H | F |
| 1 | Pm | — | — | single bond | 0 | — | — | — | single bond | H | F | F |
| 1 | Pm | — | — | —(CH$_2$)$_2$— | 0 | — | — | — | single bond | H | H | F |
| 1 | Pm | — | — | —(CH$_2$)$_2$— | 0 | — | — | — | single bond | F | H | F |
| 1 | Pm | — | — | —(CH$_2$)$_2$— | 0 | — | — | — | single bond | H | F | F |
| 1 | Pm | — | — | —CF$_2$O— | 0 | — | — | — | single bond | H | H | F |
| 1 | Pm | — | — | —CF$_2$O— | 0 | — | — | — | single bond | F | H | F |
| 1 | Pm | — | — | —CF$_2$O— | 0 | — | — | — | single bond | H | F | F |
| 1 | Pm | — | — | —OCF$_2$— | 0 | — | — | — | single bond | H | H | F |
| 1 | Pm | — | — | —OCF$_2$— | 0 | — | — | — | single bond | F | H | F |
| 1 | Pm | — | — | —OCF$_2$— | 0 | — | — | — | single bond | H | F | F |
| 1 | Pm | — | — | —CH$_2$O— | 0 | — | — | — | single bond | H | H | F |
| 1 | Pm | — | — | —CH$_2$O— | 0 | — | — | — | single bond | F | H | F |
| 1 | Pm | — | — | —CH$_2$O— | 0 | — | — | — | single bond | H | F | F |
| 1 | Pm | — | — | —OCH$_2$— | 0 | — | — | — | single bond | H | H | F |
| 1 | Pm | — | — | —OCH$_2$— | 0 | — | — | — | single bond | F | H | F |
| 1 | Pm | — | — | —OCH$_2$— | 0 | — | — | — | single bond | H | F | F |
| 1 | Pm | — | — | —C≡C— | 0 | — | — | — | single bond | H | H | F |
| 1 | Pm | — | — | —C≡C— | 0 | — | — | — | single bond | F | H | F |
| 1 | Pm | — | — | —C≡C— | 0 | — | — | — | single bond | H | F | F |
| 1 | Pm | — | — | —COO— | 0 | — | — | — | single bond | H | H | F |
| 1 | Pm | — | — | —COO— | 0 | — | — | — | single bond | F | H | F |
| 1 | Pm | — | — | —COO— | 0 | — | — | — | single bond | H | F | F |
| 1 | Pm | — | — | —OOC— | 0 | — | — | — | single bond | H | H | F |
| 1 | Pm | — | — | —OOC— | 0 | — | — | — | single bond | F | H | F |
| 1 | Pm | — | — | —OOC— | 0 | — | — | — | single bond | H | F | F |
| 1 | Pm | — | — | single bond | 0 | — | — | — | —(CH$_2$)$_2$— | H | H | F |
| 1 | Pm | — | — | single bond | 0 | — | — | — | —(CH$_2$)$_2$— | F | H | F |
| 1 | Pm | — | — | single bond | 0 | — | — | — | —(CH$_2$)$_2$— | H | F | F |
| 1 | Pm | — | — | single bond | 0 | — | — | — | —CF$_2$O— | H | H | F |
| 1 | Pm | — | — | single bond | 0 | — | — | — | —CF$_2$O— | F | H | F |
| 1 | Pm | — | — | single bond | 0 | — | — | — | —CF$_2$O— | H | F | F |
| 1 | Pm | — | — | single bond | 0 | — | — | — | —OCF$_2$— | H | H | F |

-continued

Table of exemplary substituents:

| n | A(1) | A(2) | A(3) | $Z_1$ | m | B(1) | B(2) | B(3) | $Z_2$ | $X_1$ | $X_2$ | Y |
|---|---|---|---|---|---|---|---|---|---|---|---|---|
| 1 | Pm | — | — | single bond | 0 | — | — | — | —$OCF_2$— | F | H | F |
| 1 | Pm | — | — | single bond | 0 | — | — | — | —$OCF_2$— | H | F | F |
| 1 | Pm | — | — | single bond | 0 | — | — | — | —$CH_2O$— | H | H | F |
| 1 | Pm | — | — | single bond | 0 | — | — | — | —$CH_2O$— | F | H | F |
| 1 | Pm | — | — | single bond | 0 | — | — | — | —$CH_2O$— | H | F | F |
| 1 | Pm | — | — | single bond | 0 | — | — | — | —$OCH_2$— | H | H | F |
| 1 | Pm | — | — | single bond | 0 | — | — | — | —$OCH_2$— | F | H | F |
| 1 | Pm | — | — | single bond | 0 | — | — | — | —$OCH_2$— | H | F | F |
| 1 | Pm | — | — | single bond | 0 | — | — | — | —C≡C— | H | H | F |
| 1 | Pm | — | — | single bond | 0 | — | — | — | —C≡C— | F | H | F |
| 1 | Pm | — | — | single bond | 0 | — | — | — | —C≡C— | H | F | F |
| 1 | Pm | — | — | single bond | 0 | — | — | — | —COO— | H | H | F |
| 1 | Pm | — | — | single bond | 0 | — | — | — | —COO— | F | H | F |
| 1 | Pm | — | — | single bond | 0 | — | — | — | —COO— | H | F | F |
| 1 | Pm | — | — | single bond | 0 | — | — | — | —OOC— | H | H | F |
| 1 | Pm | — | — | single bond | 0 | — | — | — | —OOC— | F | H | F |
| 1 | Pm | — | — | single bond | 0 | — | — | — | —OOC— | H | F | F |
| 0 | — | — | — | single bond | 1 | Ch | — | — | single bond | H | H | F |
| 0 | — | — | — | single bond | 1 | Ch | — | — | single bond | F | H | F |
| 0 | — | — | — | single bond | 1 | Ch | — | — | single bond | H | F | F |
| 0 | — | — | — | —$(CH_2)_2$— | 1 | Ch | — | — | single bond | H | H | F |
| 0 | — | — | — | —$(CH_2)_2$— | 1 | Ch | — | — | single bond | F | H | F |
| 0 | — | — | — | —$(CH_2)_2$— | 1 | Ch | — | — | single bond | H | F | F |
| 0 | — | — | — | —$CF_2O$— | 1 | Ch | — | — | single bond | H | H | F |
| 0 | — | — | — | —$CF_2O$— | 1 | Ch | — | — | single bond | F | H | F |
| 0 | — | — | — | —$CF_2O$— | 1 | Ch | — | — | single bond | H | F | F |
| 0 | — | — | — | —$OCF_2$— | 1 | Ch | — | — | single bond | H | H | F |
| 0 | — | — | — | —$OCF_2$— | 1 | Ch | — | — | single bond | F | H | F |
| 0 | — | — | — | —$OCF_2$— | 1 | Ch | — | — | single bond | H | F | F |
| 0 | — | — | — | —$CH_2O$— | 1 | Ch | — | — | single bond | H | H | F |
| 0 | — | — | — | —$CH_2O$— | 1 | Ch | — | — | single bond | F | H | F |
| 0 | — | — | — | —$CH_2O$— | 1 | Ch | — | — | single bond | H | F | F |
| 0 | — | — | — | —$OCH_2$— | 1 | Ch | — | — | single bond | H | H | F |
| 0 | — | — | — | —$OCH_2$— | 1 | Ch | — | — | single bond | F | H | F |
| 0 | — | — | — | —$OCH_2$— | 1 | Ch | — | — | single bond | H | F | F |
| 0 | — | — | — | —C≡C— | 1 | Ch | — | — | single bond | H | H | F |
| 0 | — | — | — | —C≡C— | 1 | Ch | — | — | single bond | F | H | F |
| 0 | — | — | — | —C≡C— | 1 | Ch | — | — | single bond | H | F | F |

-continued

Table of exemplary substituents:

| n | A(1) | A(2) | A(3) | Z₁ | m | B(1) | B(2) | B(3) | Z₂ | X₁ | X₂ | Y |
|---|---|---|---|---|---|---|---|---|---|---|---|---|
| 0 | — | — | — | —COO— | 1 | Ch | — | — | single bond | H | H | F |
| 0 | — | — | — | —COO— | 1 | Ch | — | — | single bond | F | H | F |
| 0 | — | — | — | —COO— | 1 | Ch | — | — | single bond | H | F | F |
| 0 | — | — | — | —OOC— | 1 | Ch | — | — | single bond | H | H | F |
| 0 | — | — | — | —OOC— | 1 | Ch | — | — | single bond | F | H | F |
| 0 | — | — | — | —OOC— | 1 | Ch | — | — | single bond | H | F | F |
| 0 | — | — | — | single bond | 1 | Ch | — | — | —(CH₂)₂— | H | H | F |
| 0 | — | — | — | single bond | 1 | Ch | — | — | —(CH₂)₂— | F | H | F |
| 0 | — | — | — | single bond | 1 | Ch | — | — | —(CH₂)₂— | H | F | F |
| 0 | — | — | — | single bond | 1 | Ch | — | — | —CF₂O— | H | H | F |
| 0 | — | — | — | single bond | 1 | Ch | — | — | —CF₂O— | F | H | F |
| 0 | — | — | — | single bond | 1 | Ch | — | — | —CF₂O— | H | F | F |
| 0 | — | — | — | single bond | 1 | Ch | — | — | —OCF₂— | H | H | F |
| 0 | — | — | — | single bond | 1 | Ch | — | — | —OCF₂— | F | H | F |
| 0 | — | — | — | single bond | 1 | Ch | — | — | —OCF₂— | H | F | F |
| 0 | — | — | — | single bond | 1 | — | — | — | —CH₂O— | H | H | F |
| 0 | — | — | — | single bond | 1 | Ch | — | — | —CH₂O— | F | H | F |
| 0 | — | — | — | single bond | 1 | Ch | — | — | —CH₂O— | H | F | F |
| 0 | — | — | — | single bond | 1 | — | — | — | —OCH₂— | H | H | F |
| 0 | — | — | — | single bond | 1 | Ch | — | — | —OCH₂— | F | H | F |
| 0 | — | — | — | single bond | 1 | Ch | — | — | —OCH₂— | H | F | F |
| 0 | — | — | — | single bond | 1 | Ch | — | — | —C≡C— | H | H | F |
| 0 | — | — | — | single bond | 1 | Ch | — | — | —C≡C— | F | H | F |
| 0 | — | — | — | single bond | 1 | Ch | — | — | —C≡C— | H | F | F |
| 0 | — | — | — | single bond | 1 | Ch | — | — | —COO— | H | H | F |
| 0 | — | — | — | single bond | 1 | Ch | — | — | —COO— | F | H | F |
| 0 | — | — | — | single bond | 1 | Ch | — | — | —COO— | H | F | F |
| 0 | — | — | — | single bond | 1 | Ch | — | — | —OOC— | H | H | F |
| 0 | — | — | — | single bond | 1 | Ch | — | — | —OOC— | F | H | F |
| 0 | — | — | — | single bond | 1 | Ch | — | — | —OOC— | H | F | F |
| 0 | — | — | — | single bond | 1 | Ph | — | — | single bond | H | H | F |
| 0 | — | — | — | single bond | 1 | Ph | — | — | single bond | F | H | F |
| 0 | — | — | — | single bond | 1 | Ph | — | — | single bond | H | F | F |
| 0 | — | — | — | —(CH₂)₂— | 1 | Ph | — | — | single bond | H | H | F |
| 0 | — | — | — | —(CH₂)₂— | 1 | Ph | — | — | single bond | F | H | F |
| 0 | — | — | — | —(CH₂)₂— | 1 | Ph | — | — | single bond | H | F | F |
| 0 | — | — | — | —CF₂O— | 1 | Ph | — | — | single bond | H | H | F |

-continued

Table of exemplary substituents:

| n | A(1) | A(2) | A(3) | Z₁ | m | B(1) | B(2) | B(3) | Z₂ | X₁ | X₂ | Y |
|---|---|---|---|---|---|---|---|---|---|---|---|---|
| 0 | — | — | — | —CF₂O— | 1 | Ph | — | — | single bond | F | H | F |
| 0 | — | — | — | —CF₂O— | 1 | Ph | — | — | single bond | H | F | F |
| 0 | — | — | — | —OCF₂— | 1 | Ph | — | — | single bond | H | H | F |
| 0 | — | — | — | —OCF₂— | 1 | Ph | — | — | single bond | F | H | F |
| 0 | — | — | — | —OCF₂— | 1 | Ph | — | — | single bond | H | F | F |
| 0 | — | — | — | —CH₂O— | 1 | Ph | — | — | single bond | H | H | F |
| 0 | — | — | — | —CH₂O— | 1 | Ph | — | — | single bond | F | H | F |
| 0 | — | — | — | —CH₂O— | 1 | Ph | — | — | single bond | H | F | F |
| 0 | — | — | — | —OCH₂— | 1 | Ph | — | — | single bond | H | H | F |
| 0 | — | — | — | —OCH₂— | 1 | Ph | — | — | single bond | F | H | F |
| 0 | — | — | — | —OCH₂— | 1 | Ph | — | — | single bond | H | F | F |
| 0 | — | — | — | —C≡C— | 1 | Ph | — | — | single bond | H | H | F |
| 0 | — | — | — | —C≡C— | 1 | Ph | — | — | single bond | F | H | F |
| 0 | — | — | — | —C≡C— | 1 | Ph | — | — | single bond | H | F | F |
| 0 | — | — | — | —COO— | 1 | Ph | — | — | single bond | H | H | F |
| 0 | — | — | — | —COO— | 1 | Ph | — | — | single bond | F | H | F |
| 0 | — | — | — | —COO— | 1 | Ph | — | — | single bond | H | F | F |
| 0 | — | — | — | —OOC— | 1 | Ph | — | — | single bond | H | H | F |
| 0 | — | — | — | —OOC— | 1 | Ph | — | — | single bond | F | H | F |
| 0 | — | — | — | —OOC— | 1 | Ph | — | — | single bond | H | F | F |
| 0 | — | — | — | single bond | 1 | Ph | — | — | —(CH₂)₂— | H | H | F |
| 0 | — | — | — | single bond | 1 | Ph | — | — | —(CH₂)₂— | F | H | F |
| 0 | — | — | — | single bond | 1 | Ph | — | — | —(CH₂)₂— | H | F | F |
| 0 | — | — | — | single bond | 1 | Ph | — | — | —CF₂O— | H | H | F |
| 0 | — | — | — | single bond | 1 | Ph | — | — | —CF₂O— | F | H | F |
| 0 | — | — | — | single bond | 1 | Ph | — | — | —CF₂O— | H | F | F |
| 0 | — | — | — | single bond | 1 | Ph | — | — | —OCF₂— | H | H | F |
| 0 | — | — | — | single bond | 1 | Ph | — | — | —OCF₂— | F | H | F |
| 0 | — | — | — | single bond | 1 | Ph | — | — | —OCF₂— | H | F | F |
| 0 | — | — | — | single bond | 1 | Ph | — | — | —CH₂O— | H | H | F |
| 0 | — | — | — | single bond | 1 | Ph | — | — | —CH₂O— | F | H | F |
| 0 | — | — | — | single bond | 1 | Ph | — | — | —CH₂O— | H | F | F |
| 0 | — | — | — | single bond | 1 | Ph | — | — | —OCH₂— | H | H | F |
| 0 | — | — | — | single bond | 1 | Ph | — | — | —OCH₂— | F | H | F |
| 0 | — | — | — | single bond | 1 | Ph | — | — | —OCH₂— | H | F | F |
| 0 | — | — | — | single bond | 1 | Ph | — | — | —C≡C— | H | H | F |
| 0 | — | — | — | single bond | 1 | Ph | — | — | —C≡C— | F | H | F |
| 0 | — | — | — | single bond | 1 | Ph | — | — | —C≡C— | H | F | F |

-continued

Table of exemplary substituents:

| n | A(1) | A(2) | A(3) | $Z_1$ | m | B(1) | B(2) | B(3) | $Z_2$ | $X_1$ | $X_2$ | Y |
|---|---|---|---|---|---|---|---|---|---|---|---|---|
| 0 | — | — | — | single bond | 1 | Ph | — | — | —COO— | H | H | F |
| 0 | — | — | — | single bond | 1 | Ph | — | — | —COO— | F | H | F |
| 0 | — | — | — | single bond | 1 | Ph | — | — | —COO— | H | F | F |
| 0 | — | — | — | single bond | 1 | Ph | — | — | —OOC— | H | H | F |
| 0 | — | — | — | single bond | 1 | Ph | — | — | —OOC— | F | H | F |
| 0 | — | — | — | single bond | 1 | Ph | — | — | —OOC— | H | F | F |
| 0 | — | — | — | single bond | 1 | Dx | — | — | single bond | H | H | F |
| 0 | — | — | — | single bond | 1 | Dx | — | — | single bond | F | H | F |
| 0 | — | — | — | single bond | 1 | Dx | — | — | single bond | H | F | F |
| 0 | — | — | — | —(CH$_2$)$_2$— | 1 | Dx | — | — | single bond | H | H | F |
| 0 | — | — | — | —(CH$_2$)$_2$— | 1 | Dx | — | — | single bond | F | H | F |
| 0 | — | — | — | —(CH$_2$)$_2$— | 1 | Dx | — | — | single bond | H | F | F |
| 0 | — | — | — | —CF$_2$O— | 1 | Dx | — | — | single bond | H | H | F |
| 0 | — | — | — | —CF$_2$O— | 1 | Dx | — | — | single bond | F | H | F |
| 0 | — | — | — | —CF$_2$O— | 1 | Dx | — | — | single bond | H | F | F |
| 0 | — | — | — | —OCF$_2$— | 1 | Dx | — | — | single bond | H | H | F |
| 0 | — | — | — | —OCF$_2$— | 1 | Dx | — | — | single bond | F | H | F |
| 0 | — | — | — | —OCF$_2$— | 1 | Dx | — | — | single bond | H | F | F |
| 0 | — | — | — | —CH$_2$O— | 1 | Dx | — | — | single bond | H | H | F |
| 0 | — | — | — | —CH$_2$O— | 1 | Dx | — | — | single bond | F | H | F |
| 0 | — | — | — | —CH$_2$O— | 1 | Dx | — | — | single bond | H | F | F |
| 0 | — | — | — | —OCH$_2$— | 1 | Dx | — | — | single bond | H | H | F |
| 0 | — | — | — | —OCH$_2$— | 1 | Dx | — | — | single bond | F | H | F |
| 0 | — | — | — | —OCH$_2$— | 1 | Dx | — | — | single bond | H | F | F |
| 0 | — | — | — | —C≡C— | 1 | Dx | — | — | single bond | H | H | F |
| 0 | — | — | — | —C≡C— | 1 | Dx | — | — | single bond | F | H | F |
| 0 | — | — | — | —C≡C— | 1 | Dx | — | — | single bond | H | F | F |
| 0 | — | — | — | —COO— | 1 | Dx | — | — | single bond | H | H | F |
| 0 | — | — | — | —COO— | 1 | Dx | — | — | single bond | F | H | F |
| 0 | — | — | — | —COO— | 1 | Dx | — | — | single bond | H | F | F |
| 0 | — | — | — | —OOC— | 1 | Dx | — | — | single bond | H | H | F |
| 0 | — | — | — | —OOC— | 1 | Dx | — | — | single bond | F | H | F |
| 0 | — | — | — | —OOC— | 1 | Dx | — | — | single bond | H | F | F |
| 0 | — | — | — | single bond | 1 | Dx | — | — | —(CH$_2$)$_2$— | H | H | F |
| 0 | — | — | — | single bond | 1 | Dx | — | — | —(CH$_2$)$_2$— | F | H | F |
| 0 | — | — | — | single bond | 1 | Dx | — | — | —(CH$_2$)$_2$— | H | F | F |
| 0 | — | — | — | single bond | 1 | Dx | — | — | —CF$_2$O— | H | H | F |

-continued

Table of exemplary substituents:

| n | A(1) | A(2) | A(3) | $Z_1$ | m | B(1) | B(2) | B(3) | $Z_2$ | $X_1$ | $X_2$ | Y |
|---|---|---|---|---|---|---|---|---|---|---|---|---|
| 0 | — | — | — | single bond | 1 | Dx | — | — | —$CF_2O$— | F | H | F |
| 0 | — | — | — | single bond | 1 | Dx | — | — | —$CF_2O$— | H | F | F |
| 0 | — | — | — | single bond | 1 | Dx | — | — | —$OCF_2$— | H | H | F |
| 0 | — | — | — | single bond | 1 | Dx | — | — | —$OCF_2$— | F | H | F |
| 0 | — | — | — | single bond | 1 | Dx | — | — | —$OCF_2$— | H | F | F |
| 0 | — | — | — | single bond | 1 | Dx | — | — | —$CH_2O$— | H | H | F |
| 0 | — | — | — | single bond | 1 | Dx | — | — | —$CH_2O$— | F | H | F |
| 0 | — | — | — | single bond | 1 | Dx | — | — | —$CH_2O$— | H | F | F |
| 0 | — | — | — | single bond | 1 | Dx | — | — | —$OCH_2$— | H | H | F |
| 0 | — | — | — | single bond | 1 | Dx | — | — | —$OCH_2$— | F | H | F |
| 0 | — | — | — | single bond | 1 | Dx | — | — | —$OCH_2$— | H | F | F |
| 0 | — | — | — | single bond | 1 | Dx | — | — | —C≡C— | H | H | F |
| 0 | — | — | — | single bond | 1 | Dx | — | — | —C≡C— | F | H | F |
| 0 | — | — | — | single bond | 1 | Dx | — | — | —C≡C— | H | F | F |
| 0 | — | — | — | single bond | 1 | Dx | — | — | —COO— | H | H | F |
| 0 | — | — | — | single bond | 1 | Dx | — | — | —COO— | F | H | F |
| 0 | — | — | — | single bond | 1 | Dx | — | — | —COO— | H | F | F |
| 0 | — | — | — | single bond | 1 | Dx | — | — | —OOC— | H | H | F |
| 0 | — | — | — | single bond | 1 | Dx | — | — | —OOC— | F | H | F |
| 0 | — | — | — | single bond | 1 | Dx | — | — | —OOC— | H | F | F |
| 0 | — | — | — | single bond | 1 | Py | — | — | single bond | H | H | F |
| 0 | — | — | — | single bond | 1 | Py | — | — | single bond | F | H | F |
| 0 | — | — | — | single bond | 1 | Py | — | — | single bond | H | F | F |
| 0 | — | — | — | —$(CH_2)_2$— | 1 | Py | — | — | single bond | H | H | F |
| 0 | — | — | — | —$(CH_2)_2$— | 1 | Py | — | — | single bond | F | H | F |
| 0 | — | — | — | —$(CH_2)_2$— | 1 | Py | — | — | single bond | H | F | F |
| 0 | — | — | — | —$CF_2O$— | 1 | Py | — | — | single bond | H | H | F |
| 0 | — | — | — | —$CF_2O$— | 1 | Py | — | — | single bond | F | H | F |
| 0 | — | — | — | —$CF_2O$— | 1 | Py | — | — | single bond | H | F | F |
| 0 | — | — | — | —$OCF_2$— | 1 | Py | — | — | single bond | H | H | F |
| 0 | — | — | — | —$OCF_2$— | 1 | Py | — | — | single bond | F | H | F |
| 0 | — | — | — | —$OCF_2$— | 1 | Py | — | — | single bond | H | F | F |
| 0 | — | — | — | —$CH_2O$— | 1 | Py | — | — | single bond | H | H | F |
| 0 | — | — | — | —$CH_2O$— | 1 | Py | — | — | single bond | F | H | F |
| 0 | — | — | — | —$CH_2O$— | 1 | Py | — | — | single bond | H | F | F |
| 0 | — | — | — | —$OCH_2$— | 1 | Py | — | — | single bond | H | H | F |
| 0 | — | — | — | —$OCH_2$— | 1 | Py | — | — | single bond | F | H | F |
| 0 | — | — | — | —$OCH_2$— | 1 | Py | — | — | single bond | H | F | F |

-continued

Table of exemplary substituents:

| n | A(1) | A(2) | A(3) | Z₁ | m | B(1) | B(2) | B(3) | Z₂ | X₁ | X₂ | Y |
|---|---|---|---|---|---|---|---|---|---|---|---|---|
| 0 | — | — | — | —C≡C— | 1 | Py | — | — | single bond | H | H | F |
| 0 | — | — | — | —C≡C— | 1 | Py | — | — | single bond | F | H | F |
| 0 | — | — | — | —C≡C— | 1 | Py | — | — | single bond | H | F | F |
| 0 | — | — | — | —COO— | 1 | Py | — | — | single bond | H | H | F |
| 0 | — | — | — | —COO— | 1 | Py | — | — | single bond | F | H | F |
| 0 | — | — | — | —COO— | 1 | Py | — | — | single bond | H | F | F |
| 0 | — | — | — | —OOC— | 1 | Py | — | — | single bond | H | H | F |
| 0 | — | — | — | —OOC— | 1 | Py | — | — | single bond | F | H | F |
| 0 | — | — | — | —OOC— | 1 | Py | — | — | single bond | H | F | F |
| 0 | — | — | — | single bond | 1 | Py | — | — | —(CH₂)₂— | H | H | F |
| 0 | — | — | — | single bond | 1 | Py | — | — | —(CH₂)₂— | F | H | F |
| 0 | — | — | — | single bond | 1 | Py | — | — | —(CH₂)₂— | H | F | F |
| 0 | — | — | — | single bond | 1 | Py | — | — | —CF₂O— | H | H | F |
| 0 | — | — | — | single bond | 1 | Py | — | — | —CF₂O— | F | H | F |
| 0 | — | — | — | single bond | 1 | Py | — | — | —CF₂O— | H | F | F |
| 0 | — | — | — | single bond | 1 | Py | — | — | —OCF₂— | H | H | F |
| 0 | — | — | — | single bond | 1 | Py | — | — | —OCF₂— | F | H | F |
| 0 | — | — | — | single bond | 1 | Py | — | — | —OCF₂— | H | F | F |
| 0 | — | — | — | single bond | 1 | Py | — | — | —CH₂O— | H | H | F |
| 0 | — | — | — | single bond | 1 | Py | — | — | —CH₂O— | F | H | F |
| 0 | — | — | — | single bond | 1 | Py | — | — | —CH₂O— | H | F | F |
| 0 | — | — | — | single bond | 1 | Py | — | — | —OCH₂— | H | H | F |
| 0 | — | — | — | single bond | 1 | Py | — | — | —OCH₂— | F | H | F |
| 0 | — | — | — | single bond | 1 | Py | — | — | —OCH₂— | H | F | F |
| 0 | — | — | — | single bond | 1 | Py | — | — | —C≡C— | H | H | F |
| 0 | — | — | — | single bond | 1 | Py | — | — | —C≡C— | F | H | F |
| 0 | — | — | — | single bond | 1 | Py | — | — | —C≡C— | H | F | F |
| 0 | — | — | — | single bond | 1 | Py | — | — | —COO— | H | H | F |
| 0 | — | — | — | single bond | 1 | Py | — | — | —COO— | F | H | F |
| 0 | — | — | — | single bond | 1 | Py | — | — | —COO— | H | F | F |
| 0 | — | — | — | single bond | 1 | Py | — | — | —OOC— | H | H | F |
| 0 | — | — | — | single bond | 1 | Py | — | — | —OOC— | F | H | F |
| 0 | — | — | — | single bond | 1 | Py | — | — | —OOC— | H | F | F |
| 0 | — | — | — | single bond | 1 | Pm | — | — | single bond | H | H | F |
| 0 | — | — | — | single bond | 1 | Pm | — | — | single bond | F | H | F |
| 0 | — | — | — | single bond | 1 | Pm | — | — | single bond | H | F | F |
| 0 | — | — | — | —(CH₂)₂— | 1 | Pm | — | — | single bond | H | H | F |

-continued

Table of exemplary substituents:

| n | A(1) | A(2) | A(3) | Z₁ | m | B(1) | B(2) | B(3) | Z₂ | X₁ | X₂ | Y |
|---|---|---|---|---|---|---|---|---|---|---|---|---|
| 0 | — | — | — | —(CH₂)₂— | 1 | Pm | — | — | single bond | F | H | F |
| 0 | — | — | — | —(CH₂)₂— | 1 | Pm | — | — | single bond | H | F | F |
| 0 | — | — | — | —CF₂O— | 1 | Pm | — | — | single bond | H | H | F |
| 0 | — | — | — | —CF₂O— | 1 | Pm | — | — | single bond | F | H | F |
| 0 | — | — | — | —CF₂O— | 1 | Pm | — | — | single bond | H | F | F |
| 0 | — | — | — | —OCF₂— | 1 | Pm | — | — | single bond | H | H | F |
| 0 | — | — | — | —OCF₂— | 1 | Pm | — | — | single bond | F | H | F |
| 0 | — | — | — | —OCF₂— | 1 | Pm | — | — | single bond | H | F | F |
| 0 | — | — | — | —CH₂O— | 1 | Pm | — | — | single bond | H | H | F |
| 0 | — | — | — | —CH₂O— | 1 | Pm | — | — | single bond | F | H | F |
| 0 | — | — | — | —CH₂O— | 1 | Pm | — | — | single bond | H | F | F |
| 0 | — | — | — | —OCH₂— | 1 | Pm | — | — | single bond | H | H | F |
| 0 | — | — | — | —OCH₂— | 1 | Pm | — | — | single bond | F | H | F |
| 0 | — | — | — | —OCH₂— | 1 | Pm | — | — | single bond | H | F | F |
| 0 | — | — | — | —C≡C— | 1 | Pm | — | — | single bond | H | H | F |
| 0 | — | — | — | —C≡C— | 1 | Pm | — | — | single bond | F | H | F |
| 0 | — | — | — | —C≡C— | 1 | Pm | — | — | single bond | H | F | F |
| 0 | — | — | — | —COO— | 1 | Pm | — | — | single bond | H | H | F |
| 0 | — | — | — | —COO— | 1 | Pm | — | — | single bond | F | H | F |
| 0 | — | — | — | —COO— | 1 | Pm | — | — | single bond | H | F | F |
| 0 | — | — | — | —OOC— | 1 | Pm | — | — | single bond | H | H | F |
| 0 | — | — | — | —OOC— | 1 | Pm | — | — | single bond | F | H | F |
| 0 | — | — | — | —OOC— | 1 | Pm | — | — | single bond | H | F | F |
| 0 | — | — | — | single bond | 1 | Pm | — | — | —(CH₂)₂— | H | H | F |
| 0 | — | — | — | single bond | 1 | Pm | — | — | —(CH₂)₂— | F | H | F |
| 0 | — | — | — | single bond | 1 | Pm | — | — | —(CH₂)₂— | H | F | F |
| 0 | — | — | — | single bond | 1 | Pm | — | — | —CF₂O— | H | H | F |
| 0 | — | — | — | single bond | 1 | Pm | — | — | —CF₂O— | F | H | F |
| 0 | — | — | — | single bond | 1 | Pm | — | — | —CF₂O— | H | F | F |
| 0 | — | — | — | single bond | 1 | Pm | — | — | —OCF₂— | H | H | F |
| 0 | — | — | — | single bond | 1 | Pm | — | — | —OCF₂— | F | H | F |
| 0 | — | — | — | single bond | 1 | Pm | — | — | —OCF₂— | H | F | F |
| 0 | — | — | — | single bond | 1 | Pm | — | — | —CH₂O— | H | H | F |
| 0 | — | — | — | single bond | 1 | Pm | — | — | —CH₂O— | F | H | F |
| 0 | — | — | — | single bond | 1 | Pm | — | — | —CH₂O— | H | F | F |
| 0 | — | — | — | single bond | 1 | Pm | — | — | —OCH₂— | H | H | F |
| 0 | — | — | — | single bond | 1 | Pm | — | — | —OCH₂— | F | H | F |
| 0 | — | — | — | single bond | 1 | Pm | — | — | —OCH₂— | H | F | F |

-continued

Table of exemplary substituents:

| n | A(1) | A(2) | A(3) | $Z_1$ | m | B(1) | B(2) | B(3) | $Z_2$ | $X_1$ | $X_2$ | Y |
|---|---|---|---|---|---|---|---|---|---|---|---|---|
| 0 | — | — | — | single bond | 1 | Pm | — | — | —C≡C— | H | H | F |
| 0 | — | — | — | single bond | 1 | Pm | — | — | —C≡C— | F | H | F |
| 0 | — | — | — | single bond | 1 | Pm | — | — | —C≡C— | H | F | F |
| 0 | — | — | — | single bond | 1 | Pm | — | — | —COO— | H | H | F |
| 0 | — | — | — | single bond | 1 | Pm | — | — | —COO— | F | H | F |
| 0 | — | — | — | single bond | 1 | Pm | — | — | —COO— | H | F | F |
| 0 | — | — | — | single bond | 1 | Pm | — | — | —OOC— | H | H | F |
| 0 | — | — | — | single bond | 1 | Pm | — | — | —OOC— | F | H | F |
| 0 | — | — | — | single bond | 1 | Pm | — | — | —OOC— | H | F | F |
| 1 | Ch | — | — | single bond | 1 | Ch | — | — | single bond | H | H | F |
| 1 | Ch | — | — | single bond | 1 | Ch | — | — | single bond | F | H | F |
| 1 | Ch | — | — | single bond | 1 | Ch | — | — | single bond | H | F | F |
| 1 | Ch | — | — | —(CH$_2$)$_2$— | 1 | Ch | — | — | single bond | H | H | F |
| 1 | Ch | — | — | —(CH$_2$)$_2$— | 1 | Ch | — | — | single bond | F | H | F |
| 1 | Ch | — | — | —(CH$_2$)$_2$— | 1 | Ch | — | — | single bond | H | F | F |
| 1 | Ch | — | — | —CF$_2$O— | 1 | Ch | — | — | single bond | H | H | F |
| 1 | Ch | — | — | —CF$_2$O— | 1 | Ch | — | — | single bond | F | H | F |
| 1 | Ch | — | — | —CF$_2$O— | 1 | Ch | — | — | single bond | H | F | F |
| 1 | Ch | — | — | —OCF$_2$— | 1 | Ch | — | — | single bond | H | H | F |
| 1 | Ch | — | — | —OCF$_2$— | 1 | Ch | — | — | single bond | F | H | F |
| 1 | Ch | — | — | —OCF$_2$— | 1 | Ch | — | — | single bond | H | F | F |
| 1 | Ch | — | — | —CH$_2$O— | 1 | Ch | — | — | single bond | H | H | F |
| 1 | Ch | — | — | —CH$_2$O— | 1 | Ch | — | — | single bond | F | H | F |
| 1 | Ch | — | — | —CH$_2$O— | 1 | Ch | — | — | single bond | H | F | F |
| 1 | Ch | — | — | —OCH$_2$— | 1 | Ch | — | — | single bond | H | H | F |
| 1 | Ch | — | — | —OCH$_2$— | 1 | Ch | — | — | single bond | F | H | F |
| 1 | Ch | — | — | —OCH$_2$— | 1 | Ch | — | — | single bond | H | F | F |
| 1 | Ch | — | — | —C≡C— | 1 | Ch | — | — | single bond | H | H | F |
| 1 | Ch | — | — | —C≡C— | 1 | Ch | — | — | single bond | F | H | F |
| 1 | Ch | — | — | —C≡C— | 1 | Ch | — | — | single bond | H | F | F |
| 1 | Ch | — | — | —COO— | 1 | Ch | — | — | single bond | H | H | F |
| 1 | Ch | — | — | —COO— | 1 | Ch | — | — | single bond | F | H | F |
| 1 | Ch | — | — | —COO— | 1 | Ch | — | — | single bond | H | F | F |
| 1 | Ch | — | — | —OOC— | 1 | Ch | — | — | single bond | H | H | F |
| 1 | Ch | — | — | —OOC— | 1 | Ch | — | — | single bond | F | H | F |
| 1 | Ch | — | — | —OOC— | 1 | Ch | — | — | single bond | H | F | F |
| 1 | Ch | — | — | single bond | 1 | Ch | — | — | —(CH$_2$)$_2$— | H | H | F |

-continued

Table of exemplary substituents:

| n | A(1) | A(2) | A(3) | $Z_1$ | m | B(1) | B(2) | B(3) | $Z_2$ | $X_1$ | $X_2$ | Y |
|---|---|---|---|---|---|---|---|---|---|---|---|---|
| 1 | Ch | — | — | single bond | 1 | Ch | — | — | —(CH$_2$)$_2$— | F | H | F |
| 1 | Ch | — | — | single bond | 1 | Ch | — | — | —(CH$_2$)$_2$— | H | F | F |
| 1 | Ch | — | — | single bond | 1 | Ch | — | — | —CF$_2$O— | H | H | F |
| 1 | Ch | — | — | single bond | 1 | Ch | — | — | —CF$_2$O— | F | H | F |
| 1 | Ch | — | — | single bond | 1 | Ch | — | — | —CF$_2$O— | H | F | F |
| 1 | Ch | — | — | single bond | 1 | Ch | — | — | —OCF$_2$— | H | H | F |
| 1 | Ch | — | — | single bond | 1 | Ch | — | — | —OCF$_2$— | F | H | F |
| 1 | Ch | — | — | single bond | 1 | Ch | — | — | —OCF$_2$— | H | F | F |
| 1 | Ch | — | — | single bond | 1 | Ch | — | — | —CH$_2$O— | H | H | F |
| 1 | Ch | — | — | single bond | 1 | Ch | — | — | —CH$_2$O— | F | H | F |
| 1 | Ch | — | — | single bond | 1 | Ch | — | — | —CH$_2$O— | H | F | F |
| 1 | Ch | — | — | single bond | 1 | Ch | — | — | —OCH$_2$— | H | H | F |
| 1 | Ch | — | — | single bond | 1 | Ch | — | — | —OCH$_2$— | F | H | F |
| 1 | Ch | — | — | single bond | 1 | Ch | — | — | —OCH$_2$— | H | F | F |
| 1 | Ch | — | — | single bond | 1 | Ch | — | — | —C≡C— | H | H | F |
| 1 | Ch | — | — | single bond | 1 | Ch | — | — | —C≡C— | F | H | F |
| 1 | Ch | — | — | single bond | 1 | Ch | — | — | —C≡C— | H | F | F |
| 1 | Ch | — | — | single bond | 1 | Ch | — | — | —COO— | H | H | F |
| 1 | Ch | — | — | single bond | 1 | Ch | — | — | —COO— | F | H | F |
| 1 | Ch | — | — | single bond | 1 | Ch | — | — | —COO— | H | F | F |
| 1 | Ch | — | — | single bond | 1 | Ch | — | — | —OOC— | H | H | F |
| 1 | Ch | — | — | single bond | 1 | Ch | — | — | —OOC— | F | H | F |
| 1 | Ch | — | — | single bond | 1 | Ch | — | — | —OOC— | H | F | F |
| 1 | Ph | — | — | single bond | 1 | Ch | — | — | single bond | H | H | F |
| 1 | Ph | — | — | single bond | 1 | Ch | — | — | single bond | F | H | F |
| 1 | Ph | — | — | single bond | 1 | Ch | — | — | single bond | H | F | F |
| 1 | Ph | — | — | —(CH$_2$)$_2$— | 1 | Ch | — | — | single bond | H | H | F |
| 1 | Ph | — | — | —(CH$_2$)$_2$— | 1 | Ch | — | — | single bond | F | H | F |
| 1 | Ph | — | — | —(CH$_2$)$_2$— | 1 | Ch | — | — | single bond | H | F | F |
| 1 | Ph | — | — | —CF$_2$O— | 1 | Ch | — | — | single bond | H | H | F |
| 1 | Ph | — | — | —CF$_2$O— | 1 | Ch | — | — | single bond | F | H | F |
| 1 | Ph | — | — | —CF$_2$O— | 1 | Ch | — | — | single bond | H | F | F |
| 1 | Ph | — | — | —OCF$_2$— | 1 | Ch | — | — | single bond | H | H | F |
| 1 | Ph | — | — | —OCF$_2$— | 1 | Ch | — | — | single bond | F | H | F |
| 1 | Ph | — | — | —OCF$_2$— | 1 | Ch | — | — | single bond | H | F | F |
| 1 | Ph | — | — | —CH$_2$O— | 1 | Ch | — | — | single bond | H | H | F |
| 1 | Ph | — | — | —CH$_2$O— | 1 | Ch | — | — | single bond | F | H | F |
| 1 | Ph | — | — | —CH$_2$O— | 1 | Ch | — | — | single bond | H | F | F |

-continued

Table of exemplary substituents:

| n | A(1) | A(2) | A(3) | Z₁ | m | B(1) | B(2) | B(3) | Z₂ | X₁ | X₂ | Y |
|---|---|---|---|---|---|---|---|---|---|---|---|---|
| 1 | Ph | — | — | —OCH₂— | 1 | Ch | — | — | single bond | H | H | F |
| 1 | Ph | — | — | —OCH₂— | 1 | Ch | — | — | single bond | F | H | F |
| 1 | Ph | — | — | —OCH₂— | 1 | Ch | — | — | single bond | H | F | F |
| 1 | Ph | — | — | —C≡C— | 1 | Ch | — | — | single bond | H | H | F |
| 1 | Ph | — | — | —C≡C— | 1 | Ch | — | — | single bond | F | H | F |
| 1 | Ph | — | — | —C≡C— | 1 | Ch | — | — | single bond | H | F | F |
| 1 | Ph | — | — | —COO— | 1 | Ch | — | — | single bond | H | H | F |
| 1 | Ph | — | — | —COO— | 1 | Ch | — | — | single bond | F | H | F |
| 1 | Ph | — | — | —COO— | 1 | Ch | — | — | single bond | H | F | F |
| 1 | Ph | — | — | —OOC— | 1 | Ch | — | — | single bond | H | H | F |
| 1 | Ph | — | — | —OOC— | 1 | Ch | — | — | single bond | F | H | F |
| 1 | Ph | — | — | —OOC— | 1 | Ch | — | — | single bond | H | F | F |
| 1 | Ph | — | — | single bond | 1 | Ch | — | — | —(CH₂)₂— | H | H | F |
| 1 | Ph | — | — | single bond | 1 | Ch | — | — | —(CH₂)₂— | F | H | F |
| 1 | Ph | — | — | single bond | 1 | Ch | — | — | —(CH₂)₂— | H | F | F |
| 1 | Ph | — | — | single bond | 1 | Ch | — | — | —CF₂O— | H | H | F |
| 1 | Ph | — | — | single bond | 1 | Ch | — | — | —CF₂O— | F | H | F |
| 1 | Ph | — | — | single bond | 1 | Ch | — | — | —CF₂O— | H | F | F |
| 1 | Ph | — | — | single bond | 1 | Ch | — | — | —OCF₂— | H | H | F |
| 1 | Ph | — | — | single bond | 1 | Ch | — | — | —OCF₂— | F | H | F |
| 1 | Ph | — | — | single bond | 1 | Ch | — | — | —OCF₂— | H | F | F |
| 1 | Ph | — | — | single bond | 1 | Ch | — | — | —CH₂O— | H | H | F |
| 1 | Ph | — | — | single bond | 1 | Ch | — | — | —CH₂O— | F | H | F |
| 1 | Ph | — | — | single bond | 1 | Ch | — | — | —CH₂O— | H | F | F |
| 1 | Ph | — | — | single bond | 1 | Ch | — | — | —OCH₂— | H | H | F |
| 1 | Ph | — | — | single bond | 1 | Ch | — | — | —OCH₂— | F | H | F |
| 1 | Ph | — | — | single bond | 1 | Ch | — | — | —OCH₂— | H | F | F |
| 1 | Ph | — | — | single bond | 1 | Ch | — | — | —C≡C— | H | H | F |
| 1 | Ph | — | — | single bond | 1 | Ch | — | — | —C≡C— | F | H | F |
| 1 | Ph | — | — | single bond | 1 | Ch | — | — | —C≡C— | H | F | F |
| 1 | Ph | — | — | single bond | 1 | Ch | — | — | —COO— | H | H | F |
| 1 | Ph | — | — | single bond | 1 | Ch | — | — | —COO— | F | H | F |
| 1 | Ph | — | — | single bond | 1 | Ch | — | — | —COO— | H | F | F |
| 1 | Ph | — | — | single bond | 1 | Ch | — | — | —OOC— | H | H | F |
| 1 | Ph | — | — | single bond | 1 | Ch | — | — | —OOC— | F | H | F |
| 1 | Ph | — | — | single bond | 1 | Ch | — | — | —OOC— | H | F | F |
| 1 | Dx | — | — | single bond | 1 | Ch | — | — | single bond | H | H | F |

-continued

Table of exemplary substituents:

| n | A(1) | A(2) | A(3) | Z₁ | m | B(1) | B(2) | B(3) | Z₂ | X₁ | X₂ | Y |
|---|---|---|---|---|---|---|---|---|---|---|---|---|
| 1 | Dx | — | — | single bond | 1 | Ch | — | — | single bond | F | H | F |
| 1 | Dx | — | — | single bond | 1 | Ch | — | — | single bond | H | F | F |
| 1 | Dx | — | — | —(CH₂)₂— | 1 | Ch | — | — | single bond | H | H | F |
| 1 | Dx | — | — | —(CH₂)₂— | 1 | Ch | — | — | single bond | F | H | F |
| 1 | Dx | — | — | —(CH₂)₂— | 1 | Ch | — | — | single bond | H | F | F |
| 1 | Dx | — | — | —CF₂O— | 1 | Ch | — | — | single bond | H | H | F |
| 1 | Dx | — | — | —CF₂O— | 1 | Ch | — | — | single bond | F | H | F |
| 1 | Dx | — | — | —CF₂O— | 1 | Ch | — | — | single bond | H | F | F |
| 1 | Dx | — | — | —OCF₂— | 1 | Ch | — | — | single bond | H | H | F |
| 1 | Dx | — | — | —OCF₂— | 1 | Ch | — | — | single bond | F | H | F |
| 1 | Dx | — | — | —OCF₂— | 1 | Ch | — | — | single bond | H | F | F |
| 1 | Dx | — | — | —CH₂O— | 1 | Ch | — | — | single bond | H | H | F |
| 1 | Dx | — | — | —CH₂O— | 1 | Ch | — | — | single bond | F | H | F |
| 1 | Dx | — | — | —CH₂O— | 1 | Ch | — | — | single bond | H | F | F |
| 1 | Dx | — | — | —OCH₂— | 1 | Ch | — | — | single bond | H | H | F |
| 1 | Dx | — | — | —OCH₂— | 1 | Ch | — | — | single bond | F | H | F |
| 1 | Dx | — | — | —OCH₂— | 1 | Ch | — | — | single bond | H | F | F |
| 1 | Dx | — | — | —C≡C— | 1 | Ch | — | — | single bond | H | H | F |
| 1 | Dx | — | — | —C≡C— | 1 | Ch | — | — | single bond | F | H | F |
| 1 | Dx | — | — | —C≡C— | 1 | Ch | — | — | single bond | H | F | F |
| 1 | Dx | — | — | —COO— | 1 | Ch | — | — | single bond | H | H | F |
| 1 | Dx | — | — | —COO— | 1 | Ch | — | — | single bond | F | H | F |
| 1 | Dx | — | — | —COO— | 1 | Ch | — | — | single bond | H | F | F |
| 1 | Dx | — | — | —OOC— | 1 | Ch | — | — | single bond | H | H | F |
| 1 | Dx | — | — | —OOC— | 1 | Ch | — | — | single bond | F | H | F |
| 1 | Dx | — | — | —OOC— | 1 | Ch | — | — | single bond | H | F | F |
| 1 | Dx | — | — | single bond | 1 | Ch | — | — | —(CH₂)₂— | H | H | F |
| 1 | Dx | — | — | single bond | 1 | Ch | — | — | —(CH₂)₂— | F | H | F |
| 1 | Dx | — | — | single bond | 1 | Ch | — | — | —(CH₂)₂— | H | F | F |
| 1 | Dx | — | — | single bond | 1 | Ch | — | — | —CF₂O— | H | H | F |
| 1 | Dx | — | — | single bond | 1 | Ch | — | — | —CF₂O— | F | H | F |
| 1 | Dx | — | — | single bond | 1 | Ch | — | — | —CF₂O— | H | F | F |
| 1 | Dx | — | — | single bond | 1 | Ch | — | — | —OCF₂— | H | H | F |
| 1 | Dx | — | — | single bond | 1 | Ch | — | — | —OCF₂— | F | H | F |
| 1 | Dx | — | — | single bond | 1 | Ch | — | — | —OCF₂— | H | F | F |
| 1 | Dx | — | — | single bond | 1 | Ch | — | — | —CH₂O— | H | H | F |
| 1 | Dx | — | — | single bond | 1 | Ch | — | — | —CH₂O— | F | H | F |
| 1 | Dx | — | — | single bond | 1 | Ch | — | — | —CH₂O— | H | F | F |

-continued

Table of exemplary substituents:

| n | A(1) | A(2) | A(3) | Z₁ | m | B(1) | B(2) | B(3) | Z₂ | X₁ | X₂ | Y |
|---|---|---|---|---|---|---|---|---|---|---|---|---|
| 1 | Dx | — | — | single bond | 1 | Ch | — | — | —OCH₂— | H | H | F |
| 1 | Dx | — | — | single bond | 1 | Ch | — | — | —OCH₂— | F | H | F |
| 1 | Dx | — | — | single bond | 1 | Ch | — | — | —OCH₂— | H | F | F |
| 1 | Dx | — | — | single bond | 1 | Ch | — | — | —C≡C— | H | H | F |
| 1 | Dx | — | — | single bond | 1 | Ch | — | — | —C≡C— | F | H | F |
| 1 | Dx | — | — | single bond | 1 | Ch | — | — | —C≡C— | H | F | F |
| 1 | Dx | — | — | single bond | 1 | Ch | — | — | —COO— | H | H | F |
| 1 | Dx | — | — | single bond | 1 | Ch | — | — | —COO— | F | H | F |
| 1 | Dx | — | — | single bond | 1 | Ch | — | — | —COO— | H | F | F |
| 1 | Dx | — | — | single bond | 1 | Ch | — | — | —OOC— | H | H | F |
| 1 | Dx | — | — | single bond | 1 | Ch | — | — | —OOC— | F | H | F |
| 1 | Dx | — | — | single bond | 1 | Ch | — | — | —OOC— | H | F | F |
| 1 | Py | — | — | single bond | 1 | Ch | — | — | single bond | H | H | F |
| 1 | Py | — | — | single bond | 1 | Ch | — | — | single bond | F | H | F |
| 1 | Py | — | — | single bond | 1 | Ch | — | — | single bond | H | F | F |
| 1 | Py | — | — | —(CH₂)₂— | 1 | Ch | — | — | single bond | H | H | F |
| 1 | Py | — | — | —(CH₂)₂— | 1 | Ch | — | — | single bond | F | H | F |
| 1 | Py | — | — | —(CH₂)₂— | 1 | Ch | — | — | single bond | H | F | F |
| 1 | Py | — | — | —CF₂O— | 1 | Ch | — | — | single bond | H | H | F |
| 1 | Py | — | — | —CF₂O— | 1 | Ch | — | — | single bond | F | H | F |
| 1 | Py | — | — | —CF₂O— | 1 | Ch | — | — | single bond | H | F | F |
| 1 | Py | — | — | —OCF₂— | 1 | Ch | — | — | single bond | H | H | F |
| 1 | Py | — | — | —OCF₂— | 1 | Ch | — | — | single bond | F | H | F |
| 1 | Py | — | — | —OCF₂— | 1 | Ch | — | — | single bond | H | F | F |
| 1 | Py | — | — | —CH₂O— | 1 | Ch | — | — | single bond | H | H | F |
| 1 | Py | — | — | —CH₂O— | 1 | Ch | — | — | single bond | F | H | F |
| 1 | Py | — | — | —CH₂O— | 1 | Ch | — | — | single bond | H | F | F |
| 1 | Py | — | — | —OCH₂— | 1 | Ch | — | — | single bond | H | H | F |
| 1 | Py | — | — | —OCH₂— | 1 | Ch | — | — | single bond | F | H | F |
| 1 | Py | — | — | —OCH₂— | 1 | Ch | — | — | single bond | H | F | F |
| 1 | Py | — | — | —C≡C— | 1 | Ch | — | — | single bond | H | H | F |
| 1 | Py | — | — | —C≡C— | 1 | Ch | — | — | single bond | F | H | F |
| 1 | Py | — | — | —C≡C— | 1 | Ch | — | — | single bond | H | F | F |
| 1 | Py | — | — | —COO— | 1 | Ch | — | — | single bond | H | H | F |
| 1 | Py | — | — | —COO— | 1 | Ch | — | — | single bond | F | H | F |
| 1 | Py | — | — | —COO— | 1 | Ch | — | — | single bond | H | F | F |
| 1 | Py | — | — | —OOC— | 1 | Ch | — | — | single bond | H | H | F |

-continued

Table of exemplary substituents:

| n | A(1) | A(2) | A(3) | Z₁ | m | B(1) | B(2) | B(3) | Z₂ | X₁ | X₂ | Y |
|---|---|---|---|---|---|---|---|---|---|---|---|---|
| 1 | Py | — | — | —OOC— | 1 | Ch | — | — | single bond | F | H | F |
| 1 | Py | — | — | —OOC— | 1 | Ch | — | — | single bond | H | F | F |
| 1 | Py | — | — | single bond | 1 | Ch | — | — | —(CH₂)₂— | H | H | F |
| 1 | Py | — | — | single bond | 1 | Ch | — | — | —(CH₂)₂— | F | H | F |
| 1 | Py | — | — | single bond | 1 | Ch | — | — | —(CH₂)₂— | H | F | F |
| 1 | Py | — | — | single bond | 1 | Ch | — | — | —CF₂O— | H | H | F |
| 1 | Py | — | — | single bond | 1 | Ch | — | — | —CF₂O— | F | H | F |
| 1 | Py | — | — | single bond | 1 | Ch | — | — | —CF₂O— | H | F | F |
| 1 | Py | — | — | single bond | 1 | Ch | — | — | —OCF₂— | H | H | F |
| 1 | Py | — | — | single bond | 1 | Ch | — | — | —OCF₂— | F | H | F |
| 1 | Py | — | — | single bond | 1 | Ch | — | — | —OCF₂— | H | F | F |
| 1 | Py | — | — | single bond | 1 | Ch | — | — | —CH₂O— | H | H | F |
| 1 | Py | — | — | single bond | 1 | Ch | — | — | —CH₂O— | F | H | F |
| 1 | Py | — | — | single bond | 1 | Ch | — | — | —CH₂O— | H | F | F |
| 1 | Py | — | — | single bond | 1 | Ch | — | — | —OCH₂— | H | H | F |
| 1 | Py | — | — | single bond | 1 | Ch | — | — | —OCH₂— | F | H | F |
| 1 | Py | — | — | single bond | 1 | Ch | — | — | —OCH₂— | H | F | F |
| 1 | Py | — | — | single bond | 1 | Ch | — | — | —C≡C— | H | H | F |
| 1 | Py | — | — | single bond | 1 | Ch | — | — | —C≡C— | F | H | F |
| 1 | Py | — | — | single bond | 1 | Ch | — | — | —C≡C— | H | F | F |
| 1 | Py | — | — | single bond | 1 | Ch | — | — | —COO— | H | H | F |
| 1 | Py | — | — | single bond | 1 | Ch | — | — | —COO— | F | H | F |
| 1 | Py | — | — | single bond | 1 | Ch | — | — | —COO— | H | F | F |
| 1 | Py | — | — | single bond | 1 | Ch | — | — | —OOC— | H | H | F |
| 1 | Py | — | — | single bond | 1 | Ch | — | — | —OOC— | F | H | F |
| 1 | Py | — | — | single bond | 1 | Ch | — | — | —OOC— | H | F | F |
| 1 | Pm | — | — | single bond | 1 | Ch | — | — | single bond | H | H | F |
| 1 | Pm | — | — | single bond | 1 | Ch | — | — | single bond | F | H | F |
| 1 | Pm | — | — | single bond | 1 | Ch | — | — | single bond | H | F | F |
| 1 | Pm | — | — | —(CH₂)₂— | 1 | Ch | — | — | single bond | H | H | F |
| 1 | Pm | — | — | —(CH₂)₂— | 1 | Ch | — | — | single bond | F | H | F |
| 1 | Pm | — | — | —(CH₂)₂— | 1 | Ch | — | — | single bond | H | F | F |
| 1 | Pm | — | — | —CF₂O— | 1 | Ch | — | — | single bond | H | H | F |
| 1 | Pm | — | — | —CF₂O— | 1 | Ch | — | — | single bond | F | H | F |
| 1 | Pm | — | — | —CF₂O— | 1 | Ch | — | — | single bond | H | F | F |
| 1 | Pm | — | — | —OCF₂— | 1 | Ch | — | — | single bond | H | H | F |
| 1 | Pm | — | — | —OCF₂— | 1 | Ch | — | — | single bond | F | H | F |
| 1 | Pm | — | — | —OCF₂— | 1 | Ch | — | — | single bond | H | F | F |

-continued

Table of exemplary substituents:

| n | A(1) | A(2) | A(3) | Z₁ | m | B(1) | B(2) | B(3) | Z₂ | X₁ | X₂ | Y |
|---|---|---|---|---|---|---|---|---|---|---|---|---|
| 1 | Pm | — | — | —CH₂O— | 1 | Ch | — | — | single bond | H | H | F |
| 1 | Pm | — | — | —CH₂O— | 1 | Ch | — | — | single bond | F | H | F |
| 1 | Pm | — | — | —CH₂O— | 1 | Ch | — | — | single bond | H | F | F |
| 1 | Pm | — | — | —OCH₂— | 1 | Ch | — | — | single bond | H | H | F |
| 1 | Pm | — | — | —OCH₂— | 1 | Ch | — | — | single bond | F | H | F |
| 1 | Pm | — | — | —OCH₂— | 1 | Ch | — | — | single bond | H | F | F |
| 1 | Pm | — | — | —C≡C— | 1 | Ch | — | — | single bond | H | H | F |
| 1 | Pm | — | — | —C≡C— | 1 | Ch | — | — | single bond | F | H | F |
| 1 | Pm | — | — | —C≡C— | 1 | Ch | — | — | single bond | H | F | F |
| 1 | Pm | — | — | —COO— | 1 | Ch | — | — | single bond | H | H | F |
| 1 | Pm | — | — | —COO— | 1 | Ch | — | — | single bond | F | H | F |
| 1 | Pm | — | — | —COO— | 1 | Ch | — | — | single bond | H | F | F |
| 1 | Pm | — | — | —OOC— | 1 | Ch | — | — | single bond | H | H | F |
| 1 | Pm | — | — | —OOC— | 1 | Ch | — | — | single bond | F | H | F |
| 1 | Pm | — | — | —OOC— | 1 | Ch | — | — | single bond | H | F | F |
| 1 | Pm | — | — | single bond | 1 | Ch | — | — | —(CH₂)₂— | H | H | F |
| 1 | Pm | — | — | single bond | 1 | Ch | — | — | —(CH₂)₂— | F | H | F |
| 1 | Pm | — | — | single bond | 1 | Ch | — | — | —(CH₂)₂— | H | F | F |
| 1 | Pm | — | — | single bond | 1 | Ch | — | — | —CF₂O— | H | H | F |
| 1 | Pm | — | — | single bond | 1 | Ch | — | — | —CF₂O— | F | H | F |
| 1 | Pm | — | — | single bond | 1 | Ch | — | — | —CF₂O— | H | F | F |
| 1 | Pm | — | — | single bond | 1 | Ch | — | — | —OCF₂— | H | H | F |
| 1 | Pm | — | — | single bond | 1 | Ch | — | — | —OCF₂— | F | H | F |
| 1 | Pm | — | — | single bond | 1 | Ch | — | — | —OCF₂— | H | F | F |
| 1 | Pm | — | — | single bond | 1 | Ch | — | — | —CH₂O— | H | H | F |
| 1 | Pm | — | — | single bond | 1 | Ch | — | — | —CH₂O— | F | H | F |
| 1 | Pm | — | — | single bond | 1 | Ch | — | — | —CH₂O— | H | F | F |
| 1 | Pm | — | — | single bond | 1 | Ch | — | — | —OCH₂— | H | H | F |
| 1 | Pm | — | — | single bond | 1 | Ch | — | — | —OCH₂— | F | H | F |
| 1 | Pm | — | — | single bond | 1 | Ch | — | — | —OCH₂— | H | F | F |
| 1 | Pm | — | — | single bond | 1 | Ch | — | — | —C≡C— | H | H | F |
| 1 | Pm | — | — | single bond | 1 | Ch | — | — | —C≡C— | F | H | F |
| 1 | Pm | — | — | single bond | 1 | Ch | — | — | —C≡C— | H | F | F |
| 1 | Pm | — | — | single bond | 1 | Ch | — | — | —COO— | H | H | F |
| 1 | Pm | — | — | single bond | 1 | Ch | — | — | —COO— | F | H | F |
| 1 | Pm | — | — | single bond | 1 | Ch | — | — | —COO— | H | F | F |
| 1 | Pm | — | — | single bond | 1 | Ch | — | — | —OOC— | H | H | F |

-continued

Table of exemplary substituents:

| n | A(1) | A(2) | A(3) | Z₁ | m | B(1) | B(2) | B(3) | Z₂ | X₁ | X₂ | Y |
|---|---|---|---|---|---|---|---|---|---|---|---|---|
| 1 | Pm | — | — | single bond | 1 | Ch | — | — | —OOC— | F | H | F |
| 1 | Pm | — | — | single bond | 1 | Ch | — | — | —OOC— | H | F | F |
| 1 | Ch | — | — | single bond | 1 | Ch | — | — | single bond | H | H | F |
| 1 | Ch | — | — | single bond | 1 | Ch | — | — | single bond | F | H | F |
| 1 | Ch | — | — | single bond | 1 | Ch | — | — | single bond | H | F | F |
| 1 | Ch | — | — | —(CH₂)₂— | 1 | Ch | — | — | single bond | H | H | F |
| 1 | Ch | — | — | —(CH₂)₂— | 1 | Ch | — | — | single bond | F | H | F |
| 1 | Ch | — | — | —(CH₂)₂— | 1 | Ch | — | — | single bond | H | F | F |
| 1 | Ch | — | — | —CF₂O— | 1 | Ch | — | — | single bond | H | H | F |
| 1 | Ch | — | — | —CF₂O— | 1 | Ch | — | — | single bond | F | H | F |
| 1 | Ch | — | — | —CF₂O— | 1 | Ch | — | — | single bond | H | F | F |
| 1 | Ch | — | — | —OCF₂— | 1 | Ch | — | — | single bond | H | H | F |
| 1 | Ch | — | — | —OCF₂— | 1 | Ch | — | — | single bond | F | H | F |
| 1 | Ch | — | — | —OCF₂— | 1 | Ch | — | — | single bond | H | F | F |
| 1 | Ch | — | — | —CH₂O— | 1 | Ch | — | — | single bond | H | H | F |
| 1 | Ch | — | — | —CH₂O— | 1 | Ch | — | — | single bond | F | H | F |
| 1 | Ch | — | — | —CH₂O— | 1 | Ch | — | — | single bond | H | F | F |
| 1 | Ch | — | — | —OCH₂— | 1 | Ch | — | — | single bond | H | H | F |
| 1 | Ch | — | — | —OCH₂— | 1 | Ch | — | — | single bond | F | H | F |
| 1 | Ch | — | — | —OCH₂— | 1 | Ch | — | — | single bond | H | F | F |
| 1 | Ch | — | — | —C≡C— | 1 | Ch | — | — | single bond | H | H | F |
| 1 | Ch | — | — | —C≡C— | 1 | Ch | — | — | single bond | F | H | F |
| 1 | Ch | — | — | —C≡C— | 1 | Ch | — | — | single bond | H | F | F |
| 1 | Ch | — | — | —COO— | 1 | Ch | — | — | single bond | H | H | F |
| 1 | Ch | — | — | —COO— | 1 | Ch | — | — | single bond | F | H | F |
| 1 | Ch | — | — | —COO— | 1 | Ch | — | — | single bond | H | F | F |
| 1 | Ch | — | — | —OOC— | 1 | Ch | — | — | single bond | H | H | F |
| 1 | Ch | — | — | —OOC— | 1 | Ch | — | — | single bond | F | H | F |
| 1 | Ch | — | — | —OOC— | 1 | Ch | — | — | single bond | H | F | F |
| 1 | Ch | — | — | single bond | 1 | Ch | — | — | —(CH₂)₂— | H | H | F |
| 1 | Ch | — | — | single bond | 1 | Ch | — | — | —(CH₂)₂— | F | H | F |
| 1 | Ch | — | — | single bond | 1 | Ch | — | — | —(CH₂)₂— | H | F | F |
| 1 | Ch | — | — | single bond | 1 | Ch | — | — | —CF₂O— | H | H | F |
| 1 | Ch | — | — | single bond | 1 | Ch | — | — | —CF₂O— | F | H | F |
| 1 | Ch | — | — | single bond | 1 | Ch | — | — | —CF₂O— | H | F | F |
| 1 | Ch | — | — | single bond | 1 | Ch | — | — | —OCF₂— | H | H | F |
| 1 | Ch | — | — | single bond | 1 | Ch | — | — | —OCF₂— | F | H | F |
| 1 | Ch | — | — | single | 1 | Ch | — | — | —OCF₂— | H | F | F |

-continued

Table of exemplary substituents:

| n | A(1) | A(2) | A(3) | Z₁ | m | B(1) | B(2) | B(3) | Z₂ | X₁ | X₂ | Y |
|---|---|---|---|---|---|---|---|---|---|---|---|---|
| 1 | Ch | — | — | single bond | 1 | Ch | — | — | —CH₂O— | H | H | F |
| 1 | Ch | — | — | single bond | 1 | Ch | — | — | —CH₂O— | F | H | F |
| 1 | Ch | — | — | single bond | 1 | Ch | — | — | —CH₂O— | H | F | F |
| 1 | Ch | — | — | single bond | 1 | Ch | — | — | —OCH₂— | H | H | F |
| 1 | Ch | — | — | single bond | 1 | Ch | — | — | —OCH₂— | F | H | F |
| 1 | Ch | — | — | single bond | 1 | Ch | — | — | —OCH₂— | H | F | F |
| 1 | Ch | — | — | single bond | 1 | Ch | — | — | —C≡C— | H | H | F |
| 1 | Ch | — | — | single bond | 1 | Ch | — | — | —C≡C— | F | H | F |
| 1 | Ch | — | — | single bond | 1 | Ch | — | — | —C≡C— | H | F | F |
| 1 | Ch | — | — | single bond | 1 | Ch | — | — | —COO— | H | H | F |
| 1 | Ch | — | — | single bond | 1 | Ch | — | — | —COO— | F | H | F |
| 1 | Ch | — | — | single bond | 1 | Ch | — | — | —COO— | H | F | F |
| 1 | Ch | — | — | single bond | 1 | Ch | — | — | —OOC— | H | H | F |
| 1 | Ch | — | — | single bond | 1 | Ch | — | — | —OOC— | F | H | F |
| 1 | Ch | — | — | single bond | 1 | Ch | — | — | —OOC— | H | F | F |
| 1 | Ch | — | — | single bond | 1 | Ph | — | — | single bond | H | H | F |
| 1 | Ch | — | — | single bond | 1 | Ph | — | — | single bond | F | H | F |
| 1 | Ch | — | — | single bond | 1 | Ph | — | — | single bond | H | F | F |
| 1 | Ch | — | — | —(CH₂)₂— | 1 | Ph | — | — | single bond | H | H | F |
| 1 | Ch | — | — | —(CH₂)₂— | 1 | Ph | — | — | single bond | F | H | F |
| 1 | Ch | — | — | —(CH₂)₂— | 1 | Ph | — | — | single bond | H | F | F |
| 1 | Ch | — | — | —CF₂O— | 1 | Ph | — | — | single bond | H | H | F |
| 1 | Ch | — | — | —CF₂O— | 1 | Ph | — | — | single bond | F | H | F |
| 1 | Ch | — | — | —CF₂O— | 1 | Ph | — | — | single bond | H | F | F |
| 1 | Ch | — | — | —OCF₂— | 1 | Ph | — | — | single bond | H | H | F |
| 1 | Ch | — | — | —OCF₂— | 1 | Ph | — | — | single bond | F | H | F |
| 1 | Ch | — | — | —OCF₂— | 1 | Ph | — | — | single bond | H | F | F |
| 1 | Ch | — | — | —CH₂O— | 1 | Ph | — | — | single bond | H | H | F |
| 1 | Ch | — | — | —CH₂O— | 1 | Ph | — | — | single bond | F | H | F |
| 1 | Ch | — | — | —CH₂O— | 1 | Ph | — | — | single bond | H | F | F |
| 1 | Ch | — | — | —OCH₂— | 1 | Ph | — | — | single bond | H | H | F |
| 1 | Ch | — | — | —OCH₂— | 1 | Ph | — | — | single bond | F | H | F |
| 1 | Ch | — | — | —OCH₂— | 1 | Ph | — | — | single bond | H | F | F |
| 1 | Ch | — | — | —C≡C— | 1 | Ph | — | — | single bond | H | H | F |
| 1 | Ch | — | — | —C≡C— | 1 | Ph | — | — | single bond | F | H | F |
| 1 | Ch | — | — | —C≡C— | 1 | Ph | — | — | single bond | H | F | F |
| 1 | Ch | — | — | —COO— | 1 | Ph | — | — | single bond | H | H | F |

-continued

Table of exemplary substituents:

| n | A(1) | A(2) | A(3) | $Z_1$ | m | B(1) | B(2) | B(3) | $Z_2$ | $X_1$ | $X_2$ | Y |
|---|---|---|---|---|---|---|---|---|---|---|---|---|
| 1 | Ch | — | — | —COO— | 1 | Ph | — | — | single bond | F | H | F |
| 1 | Ch | — | — | —COO— | 1 | Ph | — | — | single bond | H | F | F |
| 1 | Ch | — | — | —OOC— | 1 | Ph | — | — | single bond | H | H | F |
| 1 | Ch | — | — | —OOC— | 1 | Ph | — | — | single bond | F | H | F |
| 1 | Ch | — | — | —OOC— | 1 | Ph | — | — | single bond | H | F | F |
| 1 | Ch | — | — | single bond | 1 | Ph | — | — | —(CH$_2$)$_2$— | H | H | F |
| 1 | Ch | — | — | single bond | 1 | Ph | — | — | —(CH$_2$)$_2$— | F | H | F |
| 1 | Ch | — | — | single bond | 1 | Ph | — | — | —(CH$_2$)$_2$— | H | F | F |
| 1 | Ch | — | — | single bond | 1 | Ph | — | — | —CF$_2$O— | H | H | F |
| 1 | Ch | — | — | single bond | 1 | Ph | — | — | —CF$_2$O— | F | H | F |
| 1 | Ch | — | — | single bond | 1 | Ph | — | — | —CF$_2$O— | H | F | F |
| 1 | Ch | — | — | single bond | 1 | Ph | — | — | —OCF$_2$— | H | H | F |
| 1 | Ch | — | — | single bond | 1 | Ph | — | — | —OCF$_2$— | F | H | F |
| 1 | Ch | — | — | single bond | 1 | Ph | — | — | —OCF$_2$— | H | F | F |
| 1 | Ch | — | — | single bond | 1 | Ph | — | — | —CH$_2$O— | H | H | F |
| 1 | Ch | — | — | single bond | 1 | Ph | — | — | —CH$_2$O— | F | H | F |
| 1 | Ch | — | — | single bond | 1 | Ph | — | — | —CH$_2$O— | H | F | F |
| 1 | Ch | — | — | single bond | 1 | Ph | — | — | —OCH$_2$— | H | H | F |
| 1 | Ch | — | — | single bond | 1 | Ph | — | — | —OCH$_2$— | F | H | F |
| 1 | Ch | — | — | single bond | 1 | Ph | — | — | —OCH$_2$— | H | F | F |
| 1 | Ch | — | — | single bond | 1 | Ph | — | — | —C≡C— | H | H | F |
| 1 | Ch | — | — | single bond | 1 | Ph | — | — | —C≡C— | F | H | F |
| 1 | Ch | — | — | single bond | 1 | Ph | — | — | —C≡C— | H | F | F |
| 1 | Ch | — | — | single bond | 1 | Ph | — | — | —COO— | H | H | F |
| 1 | Ch | — | — | single bond | 1 | Ph | — | — | —COO— | F | H | F |
| 1 | Ch | — | — | single bond | 1 | Ph | — | — | —COO— | H | F | F |
| 1 | Ch | — | — | single bond | 1 | Ph | — | — | —OOC— | H | H | F |
| 1 | Ch | — | — | single bond | 1 | Ph | — | — | —OOC— | F | H | F |
| 1 | Ch | — | — | single bond | 1 | Ph | — | — | —OOC— | H | F | F |
| 1 | Ch | — | — | single bond | 1 | Dx | — | — | single bond | H | H | F |
| 1 | Ch | — | — | single bond | 1 | Dx | — | — | single bond | F | H | F |
| 1 | Ch | — | — | single bond | 1 | Dx | — | — | single bond | H | F | F |
| 1 | Ch | — | — | —(CH$_2$)$_2$— | 1 | Dx | — | — | single bond | H | H | F |
| 1 | Ch | — | — | —(CH$_2$)$_2$— | 1 | Dx | — | — | single bond | F | H | F |
| 1 | Ch | — | — | —(CH$_2$)$_2$— | 1 | Dx | — | — | single bond | H | F | F |
| 1 | Ch | — | — | —CF$_2$O— | 1 | Dx | — | — | single bond | H | H | F |
| 1 | Ch | — | — | —CF$_2$O— | 1 | Dx | — | — | single bond | F | H | F |
| 1 | Ch | — | — | —CF$_2$O— | 1 | Dx | — | — | single bond | H | F | F |

-continued

Table of exemplary substituents:

| n | A(1) | A(2) | A(3) | $Z_1$ | m | B(1) | B(2) | B(3) | $Z_2$ | $X_1$ | $X_2$ | Y |
|---|---|---|---|---|---|---|---|---|---|---|---|---|
| 1 | Ch | — | — | —OCF$_2$— | 1 | Dx | — | — | single bond | H | H | F |
| 1 | Ch | — | — | —OCF$_2$— | 1 | Dx | — | — | single bond | F | H | F |
| 1 | Ch | — | — | —OCF$_2$— | 1 | Dx | — | — | single bond | H | F | F |
| 1 | Ch | — | — | —CH$_2$O— | 1 | Dx | — | — | single bond | H | H | F |
| 1 | Ch | — | — | —CH$_2$O— | 1 | Dx | — | — | single bond | F | H | F |
| 1 | Ch | — | — | —CH$_2$O— | 1 | Dx | — | — | single bond | H | F | F |
| 1 | Ch | — | — | —OCH$_2$— | 1 | Dx | — | — | single bond | H | H | F |
| 1 | Ch | — | — | —OCH$_2$— | 1 | Dx | — | — | single bond | F | H | F |
| 1 | Ch | — | — | —OCH$_2$— | 1 | Dx | — | — | single bond | H | F | F |
| 1 | Ch | — | — | —C≡C— | 1 | Dx | — | — | single bond | H | H | F |
| 1 | Ch | — | — | —C≡C— | 1 | Dx | — | — | single bond | F | H | F |
| 1 | Ch | — | — | —C≡C— | 1 | Dx | — | — | single bond | H | F | F |
| 1 | Ch | — | — | —COO— | 1 | Dx | — | — | single bond | H | H | F |
| 1 | Ch | — | — | —COO— | 1 | Dx | — | — | single bond | F | H | F |
| 1 | Ch | — | — | —COO— | 1 | Dx | — | — | single bond | H | F | F |
| 1 | Ch | — | — | —OOC— | 1 | Dx | — | — | single bond | H | H | F |
| 1 | Ch | — | — | —OOC— | 1 | Dx | — | — | single bond | F | H | F |
| 1 | Ch | — | — | —OOC— | 1 | Dx | — | — | single bond | H | F | F |
| 1 | Ch | — | — | single bond | 1 | Dx | — | — | —(CH$_2$)$_2$— | H | H | F |
| 1 | Ch | — | — | single bond | 1 | Dx | — | — | —(CH$_2$)$_2$— | F | H | F |
| 1 | Ch | — | — | single bond | 1 | Dx | — | — | —(CH$_2$)$_2$— | H | F | F |
| 1 | Ch | — | — | single bond | 1 | Dx | — | — | —CF$_2$O— | H | H | F |
| 1 | Ch | — | — | single bond | 1 | Dx | — | — | —CF$_2$O— | F | H | F |
| 1 | Ch | — | — | single bond | 1 | Dx | — | — | —CF$_2$O— | H | F | F |
| 1 | Ch | — | — | single bond | 1 | Dx | — | — | —OCF$_2$— | H | H | F |
| 1 | Ch | — | — | single bond | 1 | Dx | — | — | —OCF$_2$— | F | H | F |
| 1 | Ch | — | — | single bond | 1 | Dx | — | — | —OCF$_2$— | H | F | F |
| 1 | Ch | — | — | single bond | 1 | Dx | — | — | —CH$_2$O— | H | H | F |
| 1 | Ch | — | — | single bond | 1 | Dx | — | — | —CH$_2$O— | F | H | F |
| 1 | Ch | — | — | single bond | 1 | Dx | — | — | —CH$_2$O— | H | F | F |
| 1 | Ch | — | — | single bond | 1 | Dx | — | — | —OCH$_2$— | H | H | F |
| 1 | Ch | — | — | single bond | 1 | Dx | — | — | —OCH$_2$— | F | H | F |
| 1 | Ch | — | — | single bond | 1 | Dx | — | — | —OCH$_2$— | H | F | F |
| 1 | Ch | — | — | single bond | 1 | Dx | — | — | —C≡C— | H | H | F |
| 1 | Ch | — | — | single bond | 1 | Dx | — | — | —C≡C— | F | H | F |
| 1 | Ch | — | — | single bond | 1 | Dx | — | — | —C≡C— | H | F | F |
| 1 | Ch | — | — | single bond | 1 | Dx | — | — | —COO— | H | H | F |

-continued

Table of exemplary substituents:

| n | A(1) | A(2) | A(3) | $Z_1$ | m | B(1) | B(2) | B(3) | $Z_2$ | $X_1$ | $X_2$ | Y |
|---|---|---|---|---|---|---|---|---|---|---|---|---|
| 1 | Ch | — | — | single bond | 1 | Dx | — | — | —COO— | F | H | F |
| 1 | Ch | — | — | single bond | 1 | Dx | — | — | —COO— | H | F | F |
| 1 | Ch | — | — | single bond | 1 | Dx | — | — | —OOC— | H | H | F |
| 1 | Ch | — | — | single bond | 1 | Dx | — | — | —OOC— | F | H | F |
| 1 | Ch | — | — | single bond | 1 | Dx | — | — | —OOC— | H | F | F |
| 1 | Ch | — | — | single bond | 1 | Py | — | — | single bond | H | H | F |
| 1 | Ch | — | — | single bond | 1 | Py | — | — | single bond | F | H | F |
| 1 | Ch | — | — | single bond | 1 | Py | — | — | single bond | H | F | F |
| 1 | Ch | — | — | —(CH$_2$)$_2$— | 1 | Py | — | — | single bond | H | H | F |
| 1 | Ch | — | — | —(CH$_2$)$_2$— | 1 | Py | — | — | single bond | F | H | F |
| 1 | Ch | — | — | —(CH$_2$)$_2$— | 1 | Py | — | — | single bond | H | F | F |
| 1 | Ch | — | — | —CF$_2$O— | 1 | Py | — | — | single bond | H | H | F |
| 1 | Ch | — | — | —CF$_2$O— | 1 | Py | — | — | single bond | F | H | F |
| 1 | Ch | — | — | —CF$_2$O— | 1 | Py | — | — | single bond | H | F | F |
| 1 | Ch | — | — | —OCF$_2$— | 1 | Py | — | — | single bond | H | H | F |
| 1 | Ch | — | — | —OCF$_2$— | 1 | Py | — | — | single bond | F | H | F |
| 1 | Ch | — | — | —OCF$_2$— | 1 | Py | — | — | single bond | H | F | F |
| 1 | Ch | — | — | —CH$_2$O— | 1 | Py | — | — | single bond | H | H | F |
| 1 | Ch | — | — | —CH$_2$O— | 1 | Py | — | — | single bond | F | H | F |
| 1 | Ch | — | — | —CH$_2$O— | 1 | Py | — | — | single bond | H | F | F |
| 1 | Ch | — | — | —OCH$_2$— | 1 | Py | — | — | single bond | H | H | F |
| 1 | Ch | — | — | —OCH$_2$— | 1 | Py | — | — | single bond | F | H | F |
| 1 | Ch | — | — | —OCH$_2$— | 1 | Py | — | — | single bond | H | F | F |
| 1 | Ch | — | — | —C≡C— | 1 | Py | — | — | single bond | H | H | F |
| 1 | Ch | — | — | —C≡C— | 1 | Py | — | — | single bond | F | H | F |
| 1 | Ch | — | — | —C≡C— | 1 | Py | — | — | single bond | H | F | F |
| 1 | Ch | — | — | —COO— | 1 | Py | — | — | single bond | H | H | F |
| 1 | Ch | — | — | —COO— | 1 | Py | — | — | single bond | F | H | F |
| 1 | Ch | — | — | —COO— | 1 | Py | — | — | single bond | H | F | F |
| 1 | Ch | — | — | —OOC— | 1 | Py | — | — | single bond | H | H | F |
| 1 | Ch | — | — | —OOC— | 1 | Py | — | — | single bond | F | H | F |
| 1 | Ch | — | — | —OOC— | 1 | Py | — | — | single bond | H | F | F |
| 1 | Ch | — | — | single bond | 1 | Py | — | — | —(CH$_2$)$_2$— | H | H | F |
| 1 | Ch | — | — | single bond | 1 | Py | — | — | —(CH$_2$)$_2$— | F | H | F |
| 1 | Ch | — | — | single bond | 1 | Py | — | — | —(CH$_2$)$_2$— | H | F | F |
| 1 | Ch | — | — | single bond | 1 | Py | — | — | —CF$_2$O— | H | H | F |
| 1 | Ch | — | — | single bond | 1 | Py | — | — | —CF$_2$O— | F | H | F |
| 1 | Ch | — | — | single bond | 1 | Py | — | — | —CF$_2$O— | H | F | F |

-continued

Table of exemplary substituents:

| n | A(1) | A(2) | A(3) | Z₁ | m | B(1) | B(2) | B(3) | Z₂ | X₁ | X₂ | Y |
|---|---|---|---|---|---|---|---|---|---|---|---|---|
| 1 | Ch | — | — | single bond | 1 | Py | — | — | —OCF₂— | H | H | F |
| 1 | Ch | — | — | single bond | 1 | Py | — | — | —OCF₂— | F | H | F |
| 1 | Ch | — | — | single bond | 1 | Py | — | — | —OCF₂— | H | F | F |
| 1 | Ch | — | — | single bond | 1 | Py | — | — | —CH₂O— | H | H | F |
| 1 | Ch | — | — | single bond | 1 | Py | — | — | —CH₂O— | F | H | F |
| 1 | Ch | — | — | single bond | 1 | Py | — | — | —CH₂O— | H | F | F |
| 1 | Ch | — | — | single bond | 1 | Py | — | — | —OCH₂— | H | H | F |
| 1 | Ch | — | — | single bond | 1 | Py | — | — | —OCH₂— | F | H | F |
| 1 | Ch | — | — | single bond | 1 | Py | — | — | —OCH₂— | H | F | F |
| 1 | Ch | — | — | single bond | 1 | Py | — | — | —C≡C— | H | H | F |
| 1 | Ch | — | — | single bond | 1 | Py | — | — | —C≡C— | F | H | F |
| 1 | Ch | — | — | single bond | 1 | Py | — | — | —C≡C— | H | F | F |
| 1 | Ch | — | — | single bond | 1 | Py | — | — | —COO— | H | H | F |
| 1 | Ch | — | — | single bond | 1 | Py | — | — | —COO— | F | H | F |
| 1 | Ch | — | — | single bond | 1 | Py | — | — | —COO— | H | F | F |
| 1 | Ch | — | — | single bond | 1 | Py | — | — | —OOC— | H | H | F |
| 1 | Ch | — | — | single bond | 1 | Py | — | — | —OOC— | F | H | F |
| 1 | Ch | — | — | single bond | 1 | Py | — | — | —OOC— | H | F | F |
| 1 | Ch | — | — | single bond | 1 | Pm | — | — | single bond | H | H | F |
| 1 | Ch | — | — | single bond | 1 | Pm | — | — | single bond | F | H | F |
| 1 | Ch | — | — | single bond | 1 | Pm | — | — | single bond | H | F | F |
| 1 | Ch | — | — | —(CH₂)₂— | 1 | Pm | — | — | single bond | H | H | F |
| 1 | Ch | — | — | —(CH₂)₂— | 1 | Pm | — | — | single bond | F | H | F |
| 1 | Ch | — | — | —(CH₂)₂— | 1 | Pm | — | — | single bond | H | F | F |
| 1 | Ch | — | — | —CF₂O— | 1 | Pm | — | — | single bond | H | H | F |
| 1 | Ch | — | — | —CF₂O— | 1 | Pm | — | — | single bond | F | H | F |
| 1 | Ch | — | — | —CF₂O— | 1 | Pm | — | — | single bond | H | F | F |
| 1 | Ch | — | — | —OCF₂— | 1 | Pm | — | — | single bond | H | H | F |
| 1 | Ch | — | — | —OCF₂— | 1 | Pm | — | — | single bond | F | H | F |
| 1 | Ch | — | — | —OCF₂— | 1 | Pm | — | — | single bond | H | F | F |
| 1 | Ch | — | — | —CH₂O— | 1 | Pm | — | — | single bond | H | H | F |
| 1 | Ch | — | — | —CH₂O— | 1 | Pm | — | — | single bond | F | H | F |
| 1 | Ch | — | — | —CH₂O— | 1 | Pm | — | — | single bond | H | F | F |
| 1 | Ch | — | — | —OCH₂— | 1 | Pm | — | — | single bond | H | H | F |
| 1 | Ch | — | — | —OCH₂— | 1 | Pm | — | — | single bond | F | H | F |
| 1 | Ch | — | — | —OCH₂— | 1 | Pm | — | — | single bond | H | F | F |
| 1 | Ch | — | — | —C≡C— | 1 | Pm | — | — | single bond | H | H | F |

-continued

Table of exemplary substituents:

| n | A(1) | A(2) | A(3) | Z₁ | m | B(1) | B(2) | B(3) | Z₂ | X₁ | X₂ | Y |
|---|---|---|---|---|---|---|---|---|---|---|---|---|
| 1 | Ch | — | — | —C≡C— | 1 | Pm | — | — | single bond | F | H | F |
| 1 | Ch | — | — | —C≡C— | 1 | Pm | — | — | single bond | H | F | F |
| 1 | Ch | — | — | —COO— | 1 | Pm | — | — | single bond | H | H | F |
| 1 | Ch | — | — | —COO— | 1 | Pm | — | — | single bond | F | H | F |
| 1 | Ch | — | — | —COO— | 1 | Pm | — | — | single bond | H | F | F |
| 1 | Ch | — | — | —OOC— | 1 | Pm | — | — | single bond | H | H | F |
| 1 | Ch | — | — | —OOC— | 1 | Pm | — | — | single bond | F | H | F |
| 1 | Ch | — | — | —OOC— | 1 | Pm | — | — | single bond | H | F | F |
| 1 | Ch | — | — | single bond | 1 | Pm | — | — | —(CH₂)₂— | H | H | F |
| 1 | Ch | — | — | single bond | 1 | Pm | — | — | —(CH₂)₂— | F | H | F |
| 1 | Ch | — | — | single bond | 1 | Pm | — | — | —(CH₂)₂— | H | F | F |
| 1 | Ch | — | — | single bond | 1 | Pm | — | — | —CF₂O— | H | H | F |
| 1 | Ch | — | — | single bond | 1 | Pm | — | — | —CF₂O— | F | H | F |
| 1 | Ch | — | — | single bond | 1 | Pm | — | — | —CF₂O— | H | F | F |
| 1 | Ch | — | — | single bond | 1 | Pm | — | — | —OCF₂— | H | H | F |
| 1 | Ch | — | — | single bond | 1 | Pm | — | — | —OCF₂— | F | H | F |
| 1 | Ch | — | — | single bond | 1 | Pm | — | — | —OCF₂— | H | F | F |
| 1 | Ch | — | — | single bond | 1 | Pm | — | — | —CH₂O— | H | H | F |
| 1 | Ch | — | — | single bond | 1 | Pm | — | — | —CH₂O— | F | H | F |
| 1 | Ch | — | — | single bond | 1 | Pm | — | — | —CH₂O— | H | F | F |
| 1 | Ch | — | — | single bond | 1 | Pm | — | — | —OCH₂— | H | H | F |
| 1 | Ch | — | — | single bond | 1 | Pm | — | — | —OCH₂— | F | H | F |
| 1 | Ch | — | — | single bond | 1 | Pm | — | — | —OCH₂— | H | F | F |
| 1 | Ch | — | — | single bond | 1 | Pm | — | — | —C≡C— | H | H | F |
| 1 | Ch | — | — | single bond | 1 | Pm | — | — | —C≡C— | F | H | F |
| 1 | Ch | — | — | single bond | 1 | Pm | — | — | —C≡C— | H | F | F |
| 1 | Ch | — | — | single bond | 1 | Pm | — | — | —COO— | H | H | F |
| 1 | Ch | — | — | single bond | 1 | Pm | — | — | —COO— | F | H | F |
| 1 | Ch | — | — | single bond | 1 | Pm | — | — | —COO— | H | F | F |
| 1 | Ch | — | — | single bond | 1 | Pm | — | — | —OOC— | H | H | F |
| 1 | Ch | — | — | single bond | 1 | Pm | — | — | —OOC— | F | H | F |
| 1 | Ch | — | — | single bond | 1 | Pm | — | — | —OOC— | H | F | F |

Although the Table only shows substitutents having n and m independently 0 or 1, it is understood that all compounds that are included in the formulas given herein are intended to be included to the same extent as if they were individually drawn.

SYNTHESIS EXAMPLE

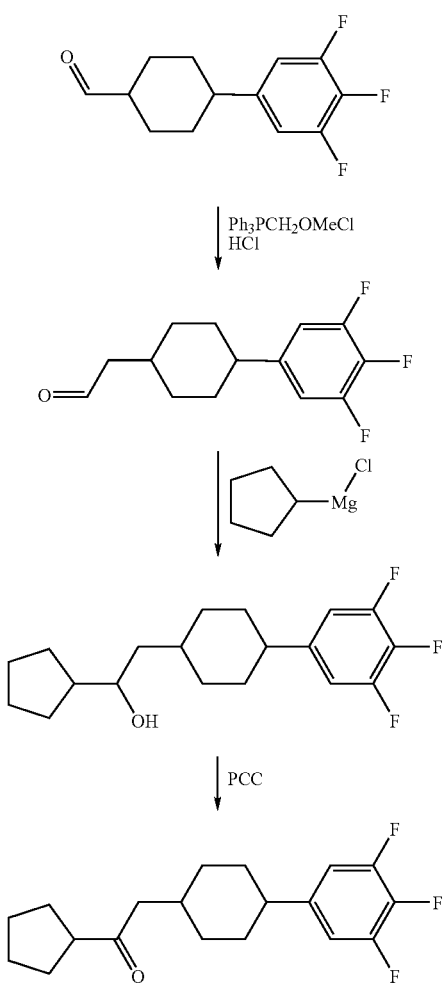

EXPERIMENTAL $F_3Ph.Ch.C_2H_2OMe$

Potassium-t-butoxide (42 ml, 1M in THF, 42 mmol) was added dropwise over 15 min to a stirred, cooled (−5° C.) slurry of $MeOCH_2PPh_3.Cl$ (13.6 g, 39.7 mmol) in dry THF (80 ml) under argon. The reaction mixture was maintained under these conditions for 2 h. To the resulting deep orange reaction mixture a solution of PCFFFL (9.4 g, 39 mmol) in dry THF (25 ml) was added dropwise, and the resulting reaction mixture was stirred for 16 h at room temp. Water (60 ml) was added to the reaction mixture, extracted with 3×75 ml hexane, the combined organic extract washed with water, dried ($MgSO_4$), and filtered over a bed of celite. The solvent was removed in vacuo to yield yellow liquid. The crude liquid was taken up in hexane/ethyl acetate (90/10, 50 ml) and filtered down a short silica gel column and washing down with hexane/EA (90/10, 250 ml). The solvent was removed in vacuo yield a pale yellow liquid; yield, 9.7 g. Crystallization from hexane (20 ml) at −20° C. gave white solid. Yield, 6.1 g.

$F_3Ph.Ch.CH_2CHO$

A mixture of $F_3Ph.Cy.C_2H_2OMe$ (6.1 g, 22.6 mmol), acetone (80 ml) and HCl (3N, 55 ml) was stirred at room temp. for 2 h. The reaction mixture was extracted with 3×50 ml ethyl acetate, the organic extract washed with water, saturated solution of $NaHCO_3$, water, dried ($MgSO_4$), and filtered over celite. The solvent was removed in vacuo to yield a clear liquid. Yield, 5.7 g.

$F_3Ph.Ch.CH_2CHOH.Cp$

A solution of $F_3Ph.Ch.CH_2CHO$ (5.7 g, 22.3 mmol) in dry ether (30 ml) was added dropwise over 15 min to a stirred, cooled (ice bath) solution of cyclopentylmagnesium bromide (15 ml, 2.0M in ether, 30 mmol). The reaction mixture was maintained under these conditions for 2 h, and 20% $H_2SO_4$ (25 ml) was added slowly and the mixture allowed to warm to room temp. Ether (20 ml) was added, organic phase washed with 2×20 ml $NaHCO_3$, water, dried ($MgSO_4$) and filtered over a bed of silica gel. The solvent was removed in vacuo to yield a pale thick liquid. Yield, 6.7 g. Crystallization from hexane (20 ml, in fridge overnight) gave the product as a white solid. Yield, 4.1 g.

$F_3Ph.Ch.CH_2CO.Cp$

A solution of $F_3Ph.Ch.CH_2CHOH.Cp$ (1.0 g, 3 mmol) in dry $CH_2Cl_2$ (10 ml) was added to a slurry of PCC (1.0 g, 4.6 mmol) in dry $CH_2Cl_2$ (15 ml), and the resulting dark brown reaction mixture was stirred at room temp. for 3 h. Hexane (30 ml) was added resulting in a brown precipitate. The reaction mixture was filtered over a bed of celite, washed with hexane (25 ml). The solvent was removed in vacuo to yield a clear liquid; yield, 1.0 g. The liquid was taken up in hexane (10 ml), loaded onto a short silica gel column, and washed down with a mixture of hexane/EA (90/10, 150 ml). The solvent was removed in vacuo to give a clear thick liquid; yield, 1.0 g. Crystallization from hexane (5 ml, in freezer overnight), gave the product as a white solid; yield, 0.52 g, 99.6% GC purity.

$F_3PhChCH_2COCp$ has the following properties:

Phase diagram: Cr 43 I $\Delta\epsilon$: 9.8

The compounds of the invention can be used in liquid crystal mixtures, as known in the art. This is shown by the following example.

| Component | Ratio (%) | Property |
|---|---|---|
| CpCP3FFF | 11.0 | N/I: 66° C. |
| CCP3FF | 17.3 | $\Delta\epsilon$: 4.5 |
| CCP5FF | 14.7 | Vth: 1.35 V |
| CPP3FF | 11.6 | γ: 75 mPas |
| CPP5FF | 5.8 | |
| ECCP3FF | 7.1 | |
| CCH35 | 16.4 | |
| CP7F | 16.0 | |
| Total | 100 | |

The components are shown below with their abbreviations:

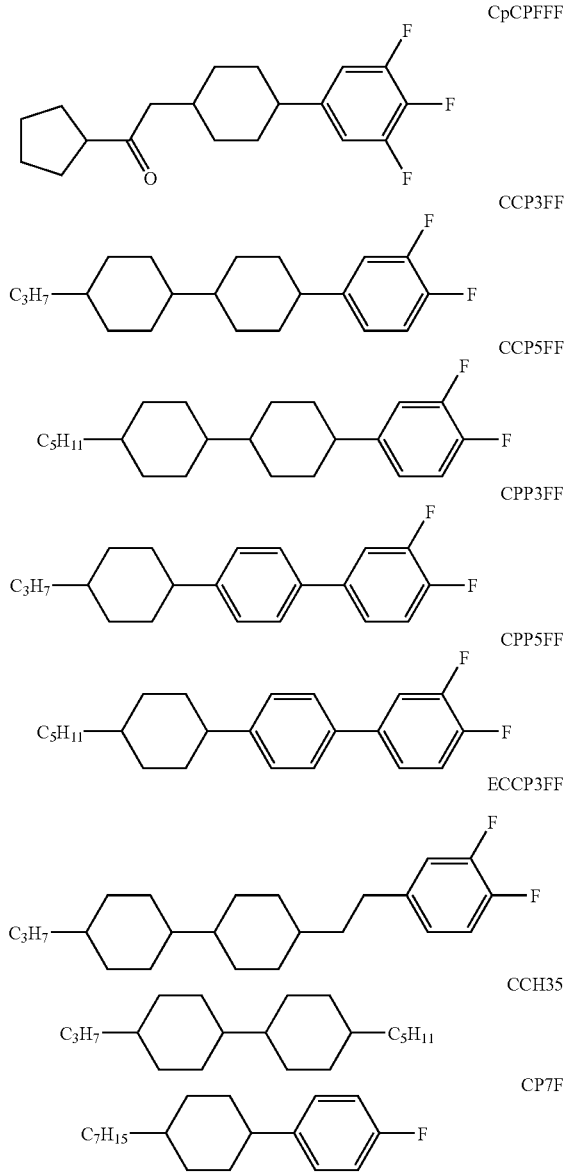

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

When a group of substituents is disclosed herein, it is understood that all individual members of those groups and all subgroups, including any isomers and enantiomers of the group members, and classes of compounds that can be formed using the substituents are disclosed separately. When a compound is claimed, it should be understood that compounds known in the art including the compounds disclosed in the references disclosed herein are not intended to be included. When a Markush group or other grouping is used herein, all individual members of the group and all combinations and subcombinations possible of the group are intended to be individually included in the disclosure.

Every formulation or combination of components described or exemplified can be used to practice the invention, unless otherwise stated. Specific names of compounds are intended to be exemplary, as it is known that one of ordinary skill in the art can name the same compounds differently. When a compound is described herein such that a particular isomer or enantiomer of the compound is not specified, for example, in a formula or in a chemical name, that description is intended to include each isomers and enantiomer of the compound described individual or in any combination. One of ordinary skill in the art will appreciate that methods, device elements, starting materials, synthetic methods, and mixture constituents other than those specifically exemplified can be employed in the practice of the invention without resort to undue experimentation. All art-known functional equivalents, of any such methods, device elements, starting materials, synthetic methods, and mixture constituents are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In general the terms and phrases used herein have their art-recognized meaning, which can be found by reference to standard texts, journal references and contexts known to those skilled in the art. The definitions are provided to clarify their specific use in the context of the invention.

All patents and publications mentioned in the specification are indicative of the levels of skill of those skilled in the art to which the invention pertains.

One skilled in the art would readily appreciate that the present invention is well adapted to carry out the objects and obtain the ends and advantages mentioned, as well as those inherent therein. The liquid crystal compounds and methods and accessory methods described herein as presently representative of preferred embodiments are exemplary and are not intended as limitations on the scope of the invention. Changes therein and other uses will occur to those skilled in the art, which are encompassed within the spirit of the invention, are defined by the scope of the claims.

Although the description herein contains many specificities, these should not be construed as limiting the scope of the invention, but as merely providing illustrations of some of the embodiments of the invention. Thus, additional embodiments are within the scope of the invention and within the following claims. All references cited herein are hereby incorporated by reference to the extent that there is no inconsistency with the disclosure of this specification. Some references provided herein are incorporated by reference herein to provide details concerning additional starting materials, additional methods of synthesis, additional methods of analysis and additional uses of the invention.

I claim:

1. A liquid crystal having the formula:

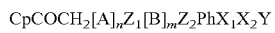

where $CpCOCH_2$ is the structure:

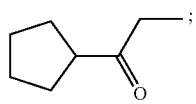

A and B are independently in each instance selected from the group consisting of 1,4-cyclohexane, 1,4-phenyl, 1,3-dioxan-5,2-diyl; pyridine-5,2-diyl; and pyrimidin-5,2-diyl;

Ph can be optionally independently substituted with one or two halogens in addition to the $X_1$, $X_2$ and Y substituents;

n and m are independently in each instance 0, 1 or 2;

$Z_1$ and $Z_2$ are independently in each instance a single bond, —$(CH_2)_2$—, $CF_2O$, $OCF_2$, $CH_2O$, $OCH_2$, —C≡C—, COO and OOC;

Y is selected from the group consisting of: F, Cl, CN, $OCH_2F$, $CHF_2$, $OCF_3$, and $CF_3$; and $X_1$ and $X_2$ are each independently H or F.

2. The liquid crystal of claim 1, wherein A and B are both 1,4-cyclohexane.

3. The liquid crystal of claim 2, wherein n and m are both 1; $Z_1$ is a single bond; $Z_2$ is a single bond; $X_1$, $X_2$ and Y are F.

4. The liquid crystal of claim 1, wherein A and B are both 1,4-phenyl; n and m are both 1; $Z_1$ is a single bond; $Z_2$ is a single bond; $X_1$, $X_2$ and Y are F.

5. The liquid crystal of claim 1, wherein A is 1,4-cyclohexene; n is 1; m is 0; $Z_1$ and $Z_2$ are single bonds; $X_1$, $X_2$ and Y are F.

6. The liquid crystal of claim 1, wherein A is 1,4-cyclohexane and B is 1,3-dioxan-5,2-diyl.

7. The liquid crystal of claim 1, wherein A is 1,4-phenyl and B is pyridine-5,2-diyl.

8. The liquid crystal of claim 1, wherein A is 1,4-phenyl and B is pyrimidin-5,2-diyl.

9. The liquid crystal of claim 1 having the formula:

10. The liquid crystal of claim 1 having the formula:

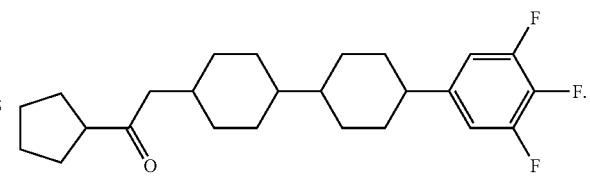

11. The liquid crystal of claim 1 having the formula:

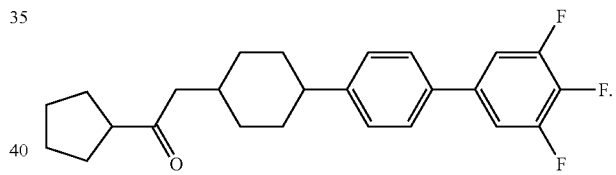

12. The liquid crystal of claim 1 having the formula:

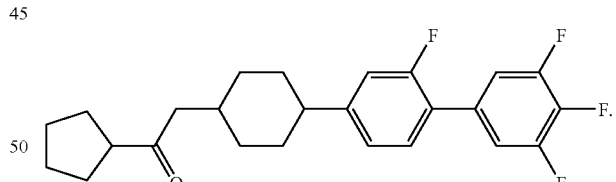

13. The liquid crystal of claim 1 having the formula:

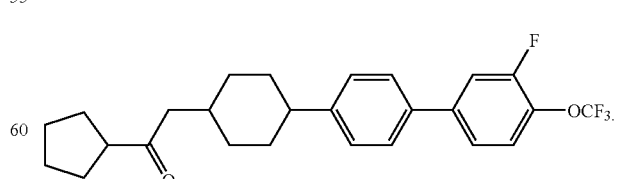

14. A liquid crystal mixture comprising a compound having the formula:

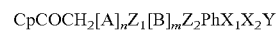

where
CpCOCH2 is the structure:

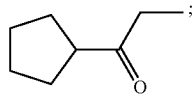

A and B are independently in each instance selected from the group consisting of 1,4-cyclohexene, 1,4-phenyl, 1,3-dioxan-5,2-diyl; pyridine-5,2-diyl; and pyrimidin-5,2-diyl;

n and m are independently in each instance 0, 1 or 2;

$Z_1$ and $Z_2$ are independently a single bond, —$(CH_2)_2$—, $CF_2O$, $OCF_2$, $CH_2O$, $OCH_2$, —C≡C—, COO, OOC;

Y is selected from the group consisting of: F, Cl, CN, $OCH_2F$, $CHF_2$, $OCF_3$, and $CF_3$; and $X_1$ and $X_2$ are each independently H or F.

15. The liquid crystal mixture of claim 14, wherein the mixture comprises 50% or less by weight of the total composition of a compound having the formula:

F$_3$Ph.Ch.CH$_2$CO.Cp.

16. The liquid crystal mixture of claim 14, wherein the mixture comprises 50% or less by weight of the total composition of a compound having the formula:

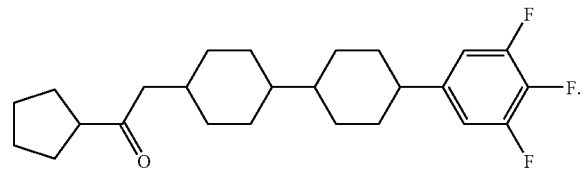

17. The liquid crystal mixture of claim 14, wherein the mixture comprises 50% or less by weight of the total composition of a compound having the formula:

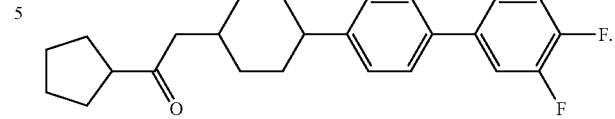

18. The liquid crystal mixture of claim 14, wherein the mixture comprises 50% or less by weight of the total composition of a compound having the formula:

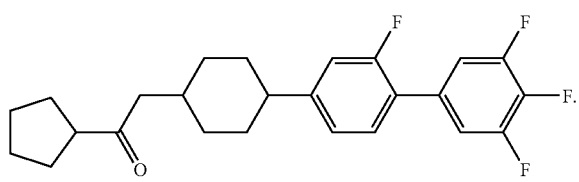

19. The liquid crystal mixture of claim 14, wherein the mixture comprises 50% or less by weight of the total composition of a compound having the formula:

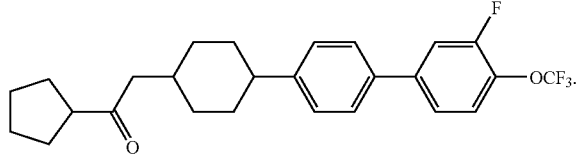

20. A device incorporating a liquid crystal of claim 1.

* * * * *